(12) United States Patent
Kim et al.

(10) Patent No.: US 9,948,763 B2
(45) Date of Patent: Apr. 17, 2018

(54) PORTABLE DEVICE AND METHOD FOR RESTRICTING USE OF PORTABLE DEVICE

(71) Applicant: Samsung Electronics Co., Ltd., Suwon-si, Gyeonggi-do (KR)

(72) Inventors: Hwa-Kyung Kim, Seoul (KR); Jun-Seok Lee, Seoul (KR); Jin-Ha Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 14/156,824

(22) Filed: Jan. 16, 2014

(65) Prior Publication Data
US 2015/0056974 A1    Feb. 26, 2015

(30) Foreign Application Priority Data

Aug. 23, 2013 (KR) .................. 10-2013-0100359

(51) Int. Cl.
| | | |
|---|---|---|
| H04M 3/00 | (2006.01) | |
| H04M 1/725 | (2006.01) | |
| G06F 9/44 | (2018.01) | |

(52) U.S. Cl.
CPC ...... *H04M 1/72563* (2013.01); *G06F 9/4443* (2013.01)

(58) Field of Classification Search
CPC ..... G06F 9/4443; G06F 9/445; G06F 9/44594
USPC ......................................... 455/418, 411, 567
See application file for complete search history.

(56) References Cited

U.S. PATENT DOCUMENTS

| | | | | |
|---|---|---|---|---|
| 8,838,077 | B2 * | 9/2014 | Felt | H04M 3/382 455/411 |
| 2007/0050432 | A1 * | 3/2007 | Yoshizawa | G06F 15/16 708/130 |
| 2008/0040386 | A1 * | 2/2008 | Godley | G06Q 10/10 |
| 2009/0205036 | A1 * | 8/2009 | Slaton | H04L 63/083 726/9 |
| 2009/0260010 | A1 * | 10/2009 | Burkhart | G06F 9/4443 718/100 |
| 2010/0235732 | A1 * | 9/2010 | Bergman | G06F 3/0488 715/702 |
| 2013/0080522 | A1 * | 3/2013 | Ren | H04L 12/6418 709/204 |
| 2013/0133087 | A1 | 5/2013 | Proctor, Jr. et al. | |
| 2013/0283275 | A1 * | 10/2013 | Kim | G06F 9/445 718/100 |

FOREIGN PATENT DOCUMENTS

EP          1 462 940 A2    9/2004

* cited by examiner

*Primary Examiner* — Kathy Wang-Hurst
*Assistant Examiner* — Said Elnoubi
(74) *Attorney, Agent, or Firm* — Jefferson IP Law, LLP

(57) ABSTRACT

A method for restricting a use of a portable device is provided. The method includes receiving an input for selecting an icon displayed on a screen of the portable device, the icon corresponding to an application for executing a concentration improvement mode that restricts the use of the application, setting a restriction time for the concentration improvement mode, deactivating the selected icon in the concentration improvement mode, and blocking a notification message provided by the application corresponding to the selected icon in the concentration improvement mode.

22 Claims, 25 Drawing Sheets

PORTABLE DEVICE AND METHOD FOR RESTRICTING USE OF PORTABLE DEVICE

CROSS-REFERENCE TO RELATED APPLICATION(S)

This application claims the benefit under 35 U.S.C. § 119(a) of a Korean patent application filed on Aug. 23, 2013 in the Korean Intellectual Property Office and assigned Serial No. 10-2013-0100359, the entire disclosure of which is hereby incorporated by reference.

TECHNICAL FIELD

The present disclosure relates to a portable device. More particularly, the present disclosure relates to a portable device and a method for restricting the use of a portable device.

BACKGROUND

Portable devices are electronic devices which have been developed for a user's convenience, and which may be implemented in various kinds of devices, such as Personal Digital Assistants (PDA), video players, feature phones, smart phones, or the like. Smart phones have the advantages of downloading and installing various applications as may be desired by a user, as well as a high portability factor, in addition to typical phone call service functions.

However, the use of smart phones can produce adverse side effects, such as a disturbance in work or a degradation of concentration. For example, with certain game applications installed in the smart phone, a push notification message may pop up in the display of the smart phone in order to invite a user to interact with the game even when the game application is not in progress. Another example is a case in which an application having a function of receiving advertisements is installed in the smart phone, and advertisement notification messages are frequently displayed on the screen of the smart phone. Such a notification requires the user to check the corresponding massages in the display of the smart phone time after time, which deteriorates a user's concentration.

Therefore, a need exists for a method of restricting the use of a portable device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for restricting the use of electronic devices.

Another aspect of the present disclosure is to provide a method and an apparatus for restricting the use of portable devices.

Another aspect of the present disclosure is to provide a method and an apparatus for restricting the use and an execution of an application in a portable device.

Another aspect of the present disclosure is to provide a method and an apparatus for blocking a push notification and a pop-up in a portable device.

Another aspect of the present disclosure is to provide a method and an apparatus for preventing multitasking and a notification pop-up when an application is being executed.

In accordance with an aspect of the present disclosure, a method of restricting a use of a portable device is provided. The method includes receiving an input for selecting an icon displayed on a screen of the portable device, the icon corresponding to an application for executing a concentration improvement mode that restricts the use of the application, setting a restriction time for the concentration improvement mode, deactivating the selected icon in the concentration improvement mode, and blocking a notification message provided by the application corresponding to the selected icon in the concentration improvement mode.

In accordance with another aspect of the present disclosure, a method of method of restricting a use of a portable device is provided. The method includes receiving a first user input for selecting at least one application for operation in a multitasking restriction mode in the portable device, and when the application is executed, operating the portable device in the multitasking restriction mode while blocking a user input through a screen area, except for an execution screen area, of the application in a display screen of the portable device, and blocking a notification of a receipt of a push notification message received by the portable device from a network.

In accordance with another aspect of the present disclosure, a portable device is provided. The portable device includes a display screen, and a controller that controls a concentration improvement mode of the portable device, wherein the controller is configured to execute receiving an input for selecting an icon displayed on a screen of the portable device, the icon corresponding to an application for executing a concentration improvement mode that restricts a use of the application, setting a restriction time for the concentration improvement mode, deactivating the selected icon in the concentration improvement mode, and blocking a notification message provided by the application corresponding to the selected icon in the concentration improvement mode.

In accordance with another aspect of the present disclosure, a portable device is provided. The portable device includes a display screen, an input unit configured to receive a first user input for selecting at least one application for operation in a multitasking restriction mode, and a controller that, when the application is executed, is configured to operate the portable device in the multitasking restriction mode while blocking a user input through a screen area, except for an execution screen area, of the application in a display screen of the portable device, and block a notification of a receipt of a push notification message received by the portable device from a network.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present specification, a portable device may be referred to as a portable terminal, a mobile terminal, a telecommunication terminal, a handheld telecommunication terminal, a handheld mobile terminal, or the like.

The portable terminal may be implemented by means of wireless telecommunication terminals having a portable size, such as smart phones, feature phones, game players, TVs, display devices, vehicle head units, notebook computers, laptop computers, tablet computers, Personal Media Players (PMP), Personal Digital Assistants (PDA), or the like.

The portable device in accordance with an embodiment of the present disclosure may be a smart phone, and some representative elements of the portable device may be omitted or changed from representative configurations of the portable device described herein.

Figure 1:
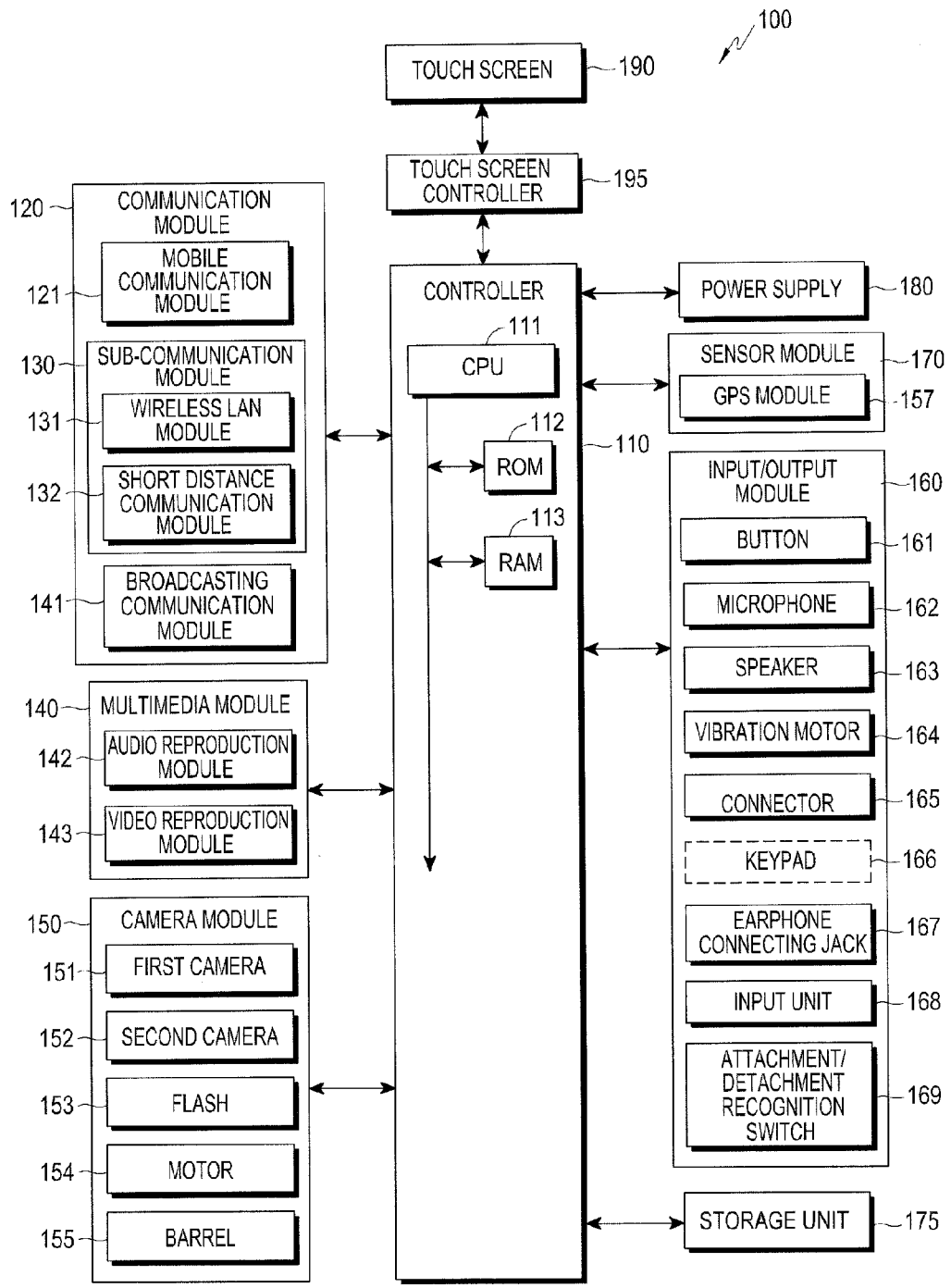
FIG. 1 is a block diagram schematically illustrating a portable device according to an embodiment of the present disclosure

FIG. 1 is a block diagram schematically illustrating a portable device according to an embodiment of the present disclosure.

Referring to FIG. 1, a portable device 100 can be connected with an external electronic device (not shown) by using at least one of a communication module 120, a connector 165, and an earphone connecting jack 167. The electronic device may include one of various devices such as an earphone, an external speaker, a Universal Serial Bus (USB) memory, a charger, a cradle/dock, a Digital Mobile Broadcasting (DMB) antenna, a mobile payment related device, a health management device (e.g., a blood sugar tester or the like), a game machine, a car navigation device and the like, which can be removably attached to the portable device 100 through a wire. Further, the electronic device may include a Bluetooth communication device, a Near Field Communication (NFC) device, a WiFi Direct communication device, and a wireless Access Point (AP), which can be wirelessly connected. In addition, the portable device 100 can be connected with another portable terminal or an electronic device, for example, one of a mobile phone, a smart phone, a tablet PC, a desktop PC, and a server, by wire or wireless.

Referring to FIG. 1, the portable device 100 includes at least one touch screen 190 and at least one touch screen controller 195. Further, the portable device 100 includes a controller 110, a communication module 120, a multimedia module 140, a camera module 150, an input/output module 160, a sensor module 170, a storage unit 175, and a power supplier 180.

The communication module 120 includes a mobile communication module 121, a sub communication module 130, and a broadcasting communication module 141

The sub communication module 130 includes at least one of a wireless Local Area Network (LAN) module 131 and a short distance communication module 132, and the multimedia module 140 includes at least one of an audio reproduction module 142 and a video reproduction module 143.

The controller 110 includes a Control Processing Unit (CPU) 111, a Read Only Memory (ROM) 112 storing a control program for controlling the portable device 100, and a Random Access Memory (RAM) 113 used as a storage area for storing a signal or data input from the outside of the portable device 100 or for work performed in the portable device 100. The CPU 111 includes a single core, a dual core, a triple core, or a quadruple core. The CPU 111, the ROM 112, and the RAM 113 can be mutually connected to each other through an internal bus.

The controller 110 can control the communication module 120, the multimedia module 140, the camera module 150, the input/output module 160, the sensor module 170, the storage unit 175, the power supplier 180, the touch screen 190, and the touch screen controller 195.

The controller 110 detects a user input from an input unit 168 or from a touchable user input means such as a user's finger touches or approaches one object or is located close to the object in a state in which a plurality of objects or items are displayed on the touch screen 190, and identifies an object corresponding to a position of the touch screen 190 where the user input is generated. The user input through the touch screen 190 includes one of a direct touch input of directly touching the object and a hovering input, which is an indirect touch input approaching the object within a preset recognition range, but not directly touching the object. For example, when the input unit 168 is located close to the touch screen 190, an object located directly below the input unit 168 may be selected. According to the present disclosure, user inputs include a gesture input through the camera module 150, a switch/button input through a physical button set (161a, 161b, and 161c; hereinafter, referred to as a "button 161") or the keypad 166, a voice input through the microphone 162 and the like, as well as the user input through the touch screen 190.

The object is or may be displayed on the touch screen 190 of the portable device 100. For example, the object includes at least one of an application, a menu, a function item, a document, a widget, a picture, a video, an e-mail, a Short Messaging Service (SMS) message, and a Multimedia Messaging Service (MMS) message, and can be selected, executed, deleted, canceled, stored, and changed by a user input means. Such an object may have a wide range of meaning encompassing folders that store at least one object, as well as buttons, icons and thumbnail images in the portable device. In various embodiments of the present disclosure, a menu indicates an executable function, such as an icon or a function item. Further, such a function item may be displayed in the form of an icon or a text.

The short-cut icon is an image displayed on the touch screen 190 of the portable device 100 to rapidly execute each application or operation of phone communication, a contact number, a menu, and the like, provided in the portable device 100. When a command or selection for executing the application or the operation is input, the short-cut icon executes the corresponding application.

Further, the controller 110 can detect a user input even, such as a hovering event, as the input unit 168 approaches the touch screen 190 or is located close to the touch screen 190.

When a user input event is generated according to a preset item or in a preset manner, the controller 110 may provide a haptic effect corresponding to the user input event. Such a haptic effect may be provided in response to an input by fingers or an input unit 168.

The controller 110 can output a control signal to the input unit 168 or to the vibration device 164. The control signal includes information on a vibration pattern and the input unit 168 or the vibration device 164 generates a vibration according to the vibration pattern. The information on the vibration pattern may indicate the vibration pattern itself or an indicator of the vibration pattern. Alternatively, the control signal may include only a request for generating the vibration.

The portable device 100 may include at least one of the mobile communication module 121, the wireless LAN module 131, and the short distance communication module 132 according to a capability thereof.

The mobile communication module 121 enables the portable device 100 to be connected with the external device through mobile communication by using one antenna or a plurality of antennas according to a control of the controller 110. The mobile communication module 121 transmits/receives a wireless signal for voice phone communication, video phone communication, an SMS, or an MMS to/from a mobile phone (not shown), a smart phone (not shown), a tablet PC, or to another device (not shown) having a phone number input into the portable device 100.

The sub communication module 130 includes at least one of the wireless LAN module 131 and the short distance communication module 132. For example, the sub communication module 130 includes only the wireless LAN module 131, only the short distance communication module 132, or both the wireless LAN module 131 and the short distance communication module 132.

The wireless LAN module 131 can be Internet-connected according to a control of the controller 110 in a place where a wireless Access Point (AP) (not shown) is installed. The wireless LAN module 131 supports the wireless LAN standard (IEEE802.11x) of the Institute of Electrical and Electronic Engineers (IEEE). The short distance communication module 132 can wirelessly perform near field communication between the portable device 100 and an image forming apparatus (not shown) according to a control of the controller 110. A short distance communication scheme may include Bluetooth, Infrared Data Association (IrDA) communication, WiFi-Direct communication, NFC and the like.

The controller 110 can transmit the control signal according to a haptic pattern to the input unit 168 through the sub communication module 130.

The broadcasting communication module 141 can receive a broadcasting signal (for example, a TV broadcasting signal, a radio broadcasting signal, a data broadcasting signal, or the like) and broadcasting supplement information (for example, in an Electric Program Guide (EPG) or an Electric Service Guide (ESG)) output from a broadcasting station through a broadcasting communication antenna (not shown) according to a control of the controller 110.

The multimedia module 140 includes the audio reproduction module 142 or the video reproduction module 143. The audio reproduction module 142 can reproduce a digital audio file (for example, a file having a file extension of mp3, wma, ogg, way, or the like) stored or received according to a control of the controller 110. The video reproduction module 143 can reproduce a digital video file (for example, a file having a file extension of mpeg, mpg, mp4, avi, mov, mkv, or the like) stored or received according to a control of the controller 110. The multimedia module 140 may be integrated in the controller 110.

The camera module 150 includes at least one of the first camera 151 and the second camera 152 for photographing a still image or a video according to a control of the controller 110. Further, the camera module 150 includes at least one of a barrel 155 performing a zoom in/zoom out for photographing a subject, a motor 154 for controlling a motion of the barrel 155, and a flash 153 for providing a light source required for photographing the subject. The first camera 151 may be disposed on the front surface of the portable device 100 and the second camera 152 may be disposed on the rear surface of the portable device 100. In a different embodiment, the first camera 151 and the second camera 152 are disposed adjacently to each other (for example, an interval between the first camera 151 and the second camera 152 is larger than 1 cm and smaller than 8 cm) to photograph a three dimensional still image or a three dimensional video.

Each of the first and second cameras 151 and 152 includes a lens system, an image sensor and the like. The cameras 151 and 152 convert an optical signal input (or photographed) through the lens system to an image signal and output the converted image signal to the controller 110. Then, the user can photograph a video or a still image through the cameras 151 and 152.

The input/output module 160 includes at least one button 161, at least one microphone 162, at least one speaker 163, at least one vibration motor 164, a connector 165, a keypad 166, an earphone connection jack 167, and an input unit 168. The input/output module 160 is not limited thereto, and a mouse, a trackball, a joystick, or a cursor control, such as a cursor direction key, may be provided for controlling a motion of a cursor on the touch screen 190.

The button 161 may be formed on a front surface, a side surface, or a back surface a housing (or a case) of the portable device 100, and may include at least one of a power/lock button, a volume button, a menu button, a home button, a back button, and a search button.

The microphone 162 receives a voice or a sound to generate an electrical signal according to a control of the controller 110.

The speaker 163 can output sounds corresponding to various signals or data (for example, wireless data, broadcasting data, digital audio data, digital video data and the like) to the outside of the portable device 100 according to a control of the controller 110. The speaker 163 can output a sound (for example, button tone corresponding to phone communication, ringing tone, and a voice of another user) corresponding to a function performed by the portable device 100. One or more speakers 163 may be formed at a proper position or positions of the housing of the portable device 100.

The vibration device 164 can convert an electrical signal to a mechanical vibration according to a control of the controller 110. For example, when a portable device 100 in a vibration mode receives a voice or video call from another device (not shown), the vibration device 164 works. One vibration device 164 or a plurality of vibration devices 164 may be formed within the housing of the portable device 100. The vibration device 164 can work in accordance with a user input through the touch screen 190.

The connector 165 may be used as an interface for connecting the portable device 100 with an external electronic device or a power source (not shown). The controller 110 can transmit or receive data stored in the storage unit 175 of the portable device 100 to or from an external electronic device through a wired cable connected to the connector 165. The portable device 100 can receive power from the power source through the wired cable connected to the connector 165 or charge a battery (not shown) by using the power source.

The keypad 166 may receive a key input from the user so as to control the portable device 100. The keypad 166 includes a physical keypad (not shown) formed in the portable device 100 or a virtual keypad (not shown) displayed on the display unit 190. The physical keypad (not shown) formed in the portable device 100 may be excluded according to the capability or structure of the device 100.

An earphone (not shown) may be inserted in the earphone connecting jack 167 to be connected with the portable device 100.

The input unit 168 may be inserted in the inside of the portable terminal 10 so that it can be withdrawn or separated from the portable device 100 when it is used. An attachment/detachment recognition switch 169 which works in accordance with an installation and attachment/detachment of the input unit 168 is located in one area within the portable device 100 into which the input unit 168 is inserted, and the attachment/detachment recognition switch 169 can output signals corresponding to the installation and separation of the input unit 168 to the controller 110. The attachment/detachment recognition switch 169 may be configured to directly/indirectly contact the input unit 168 when the input unit 168 is mounted. The attachment/detachment recognition switch 169 generates a signal corresponding to the attachment or the detachment (that is, a signal notifying of the attachment or the detachment of the input unit 168) based on whether the attachment/detachment recognition switch 169 is connected with the input unit 168 and then outputs the generated signal to the controller 110.

The sensor module 170 includes at least one sensor that detects the status of the portable device 100. For example, the sensor module 170 includes at least one of a proximity sensor for detecting whether the user approaches the portable device 100, an illumination sensor (not shown) for detecting an amount of ambient light of the portable device 100, a motion sensor (not shown) for detecting a motion (for example, rotation, acceleration, or vibration of the portable device 100) of the portable device 100, a geo-magnetic sensor for detecting a point of the compass by using the Earth's magnetic field, a gravity sensor for detecting a gravity action direction, an altimeter for measuring an atmospheric pressure to detect an altitude, and a Global Positioning Sensor (GPS) module 157.

The GPS module 157 can receive radio waves from a plurality of GPS satellites (not shown) in Earth's orbit and calculate a position of the portable device 100 by using Time of Arrival from the GPS satellites to the portable device 100.

The storage unit 175 can store a signal or data input/output according to the operation of the communication module 120, the multimedia module 140, the camera module 150, the input/output module 160, the sensor module 170, or the touch screen 190. The storage unit 175 can store a control program and applications for controlling the apparatus 100 or the controller 110.

The term "storage unit" is used as a term which refers to a random data storage device such as the storage unit 175, the ROM 112 or the RAM 113 within the controller 110, or a memory card (for example, an SD card or a memory stick) installed in the portable device 100. The storage unit 175 may include a non-volatile memory, a volatile memory, a Hard Disk Drive (HDD), a Solid State Drive (SSD), or the like.

Memory in storage unit 175 may store various applications such as a navigation application, a video call application, a game application, a time-based alert application, or the like. The memory of storage unit 175 may also store images to provide a Graphical User Interface (GUI) related to an application, a database or data related to user information, documents and methods for processing a touch-input, background images (e.g., a menu screen, an idle screen, etc.) for processing data and operating the portable device 100, management applications, photo images taken by a camera module 150, or the like.

The storage unit 175 is a machine-readable medium (e.g. a computer readbable medium), The term "machine-readable medium" may be defined as a medium for providing data to the machine to perform a specific function. The storage unit 175 includes a non-volatile medium and a volatile medium. All of these media should be a type that allows the commands transferred by the media to be detected by a physical instrument in which the machine reads the commands into the physical instrument.

The computer readable storage medium includes, but is not limited to, at least one of a floppy disk, a flexible disk, a hard disks, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash-EPROM.

The power supplier 180 can supply power to one battery or a plurality of batteries arranged at the housing of the portable device 100 according to a control of the controller 110. The one battery or the plurality of batteries supply power to the portable device 100. Further, the power supplier 180 can supply power input from an external power source through a wired cable connected to the connector 165 to the portable device 100. In addition, the power supplier 180 can supply power wirelessly input from the external power source through a wireless charging technology to the portable device 100.

The portable device 100 includes at least one touch screen 190 providing user graphical interfaces corresponding to various services (for example, a phone call, a data transmission, a broadcasting service, a photography service, or the like) to the user.

The touch screen 190 can output an analog signal corresponding to at least one user input into the user graphical interface to the touch screen controller 195.

The touch screen 190 can receive at least one user input through a user's body (for example, fingers including a thumb) or the input unit 168 (for example, a stylus pen or an electronic pen).

The touch screen 190 can receive successive motions of one touch (that is, a drag input). The touch screen 190 can output an analog signal corresponding to the successive motions of the input touch to the touch screen controller 195.

The touch used in the present disclosure is not limited to a contact between the touch screen 190 and the finger or input unit 168, and may include a noncontact (for example, a case in which the user input means is located within a recognition distance (for example, 1 cm) where the user input means can be detected without a direct contact). A distance or interval within which the user input means can be recognized in the touch screen 190 may be changed according to a capacity or structure of the portable device 100. Particularly, the touch screen 190 is configured to output different values (for example, including a voltage value or a current value as an analog value) detected by a direct touch event and a hovering event so that the direct touch event by a contact with the user input means and the direct touch event (that is, the hovering event) can be distinguishably detected.

The touch screen 190 may be implemented in a resistive type, a capacitive type, an infrared type, an acoustic wave type, or a combination thereof.

Further, the touch screen 190 includes two or more touch panels which can detect touches or approaches of the finger and the input unit 168 in order to receive inputs by the finger and the input unit 168, respectively. The two or more touch panels provide different output values to the touch screen controller 195. Then, the touch screen controller 195 can recognize the different values input to the two or more touch panels to distinguish whether the input from the touch screen 190 is an input by the finger or an input by the input unit 168.

The touch screen controller 195 converts an analog signal received from the touch screen 190 to a digital signal and transmits the converted digital signal to the controller 110. The controller 110 can control the touch screen 190 by using the digital signal received from the touch screen controller 195. For example, the controller 110 allows a short-cut icon (not shown) or an object displayed on the touch screen 190 to be executed in response to the direct touch event or the hovering event. Further, the touch screen controller 195 may be integrated with the controller 110.

The touch screen controller 195 can identify a hovering interval or distance as well as a position of the user input by detecting a value (for example, a current value or the like) output through the touch screen 190, can convert the identified distance value to a digital signal (for example, a Z coordinate), and then can provide the converted digital signal to the controller 110. Further, the touch screen controller 195 can detect a pressure applied to the touch screen 190 by the user input means by detecting the value (for example, the current value or the like) output through the touch screen 190, can convert the identified pressure value to a digital signal, and can then provide the converted digital signal to the controller 110.

Figure 2:
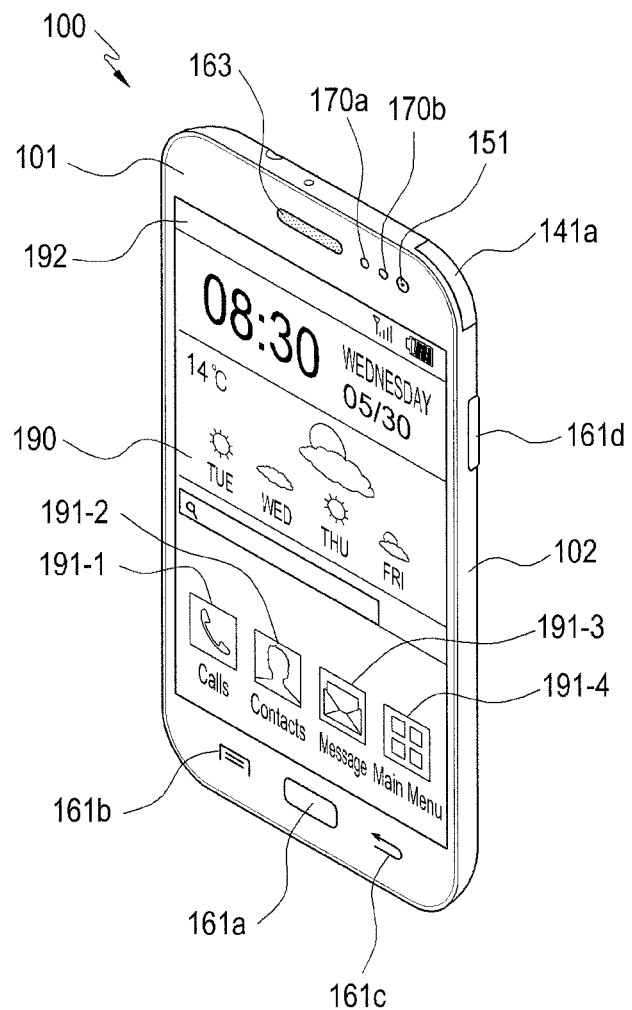
FIG. 2 is a front perspective view illustrating a portable device in accordance with an embodiment of the present disclosure.
Figure 3:
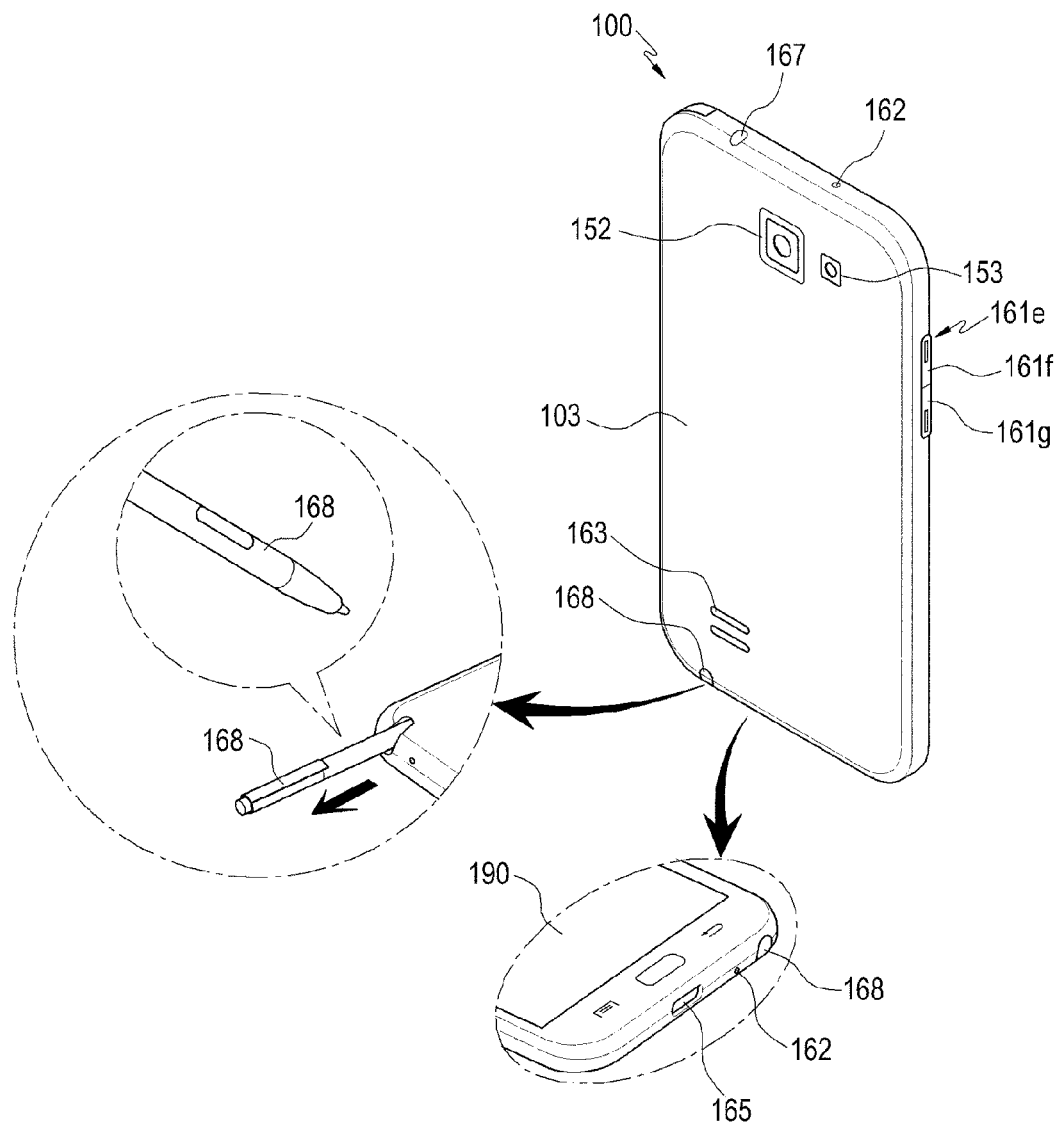
FIG. 3 is a rear perspective view illustrating a portable device in accordance with an embodiment of the present disclosure.

FIG. 2 is a front perspective view of the portable device according to an embodiment of the present disclosure, and FIG. 3 is a rear perspective view of the portable device according to an embodiment of the present disclosure.

Referring to FIGS. 2 and 3, the touch screen 190 is disposed on a center of a front surface 101 of the portable device 100. The touch screen 190 can have a large size to occupy most of the front surface 101 of the portable device 100. FIG. 2 shows an example in which a main home screen is displayed on the touch screen 190. The main home screen is a first screen displayed on the touch screen 190 when power of the portable device 100 is turned on. When the portable device 100 includes a plurality of pages of different home screens, the main home screen may be the first home screen among the plurality of pages of home screens. Short-cut icons 191-1, 191-2, and 191-3 for executing frequently used applications, a main menu switching key 191-4, time, weather and the like may be displayed on the home screen. When the user selects the main menu switching key 191-4, the menu screen is displayed on the touch screen 190. Also, a status bar 192 may be provided at the upper portion of the touch screen 190, which displays information, symbols, icons and letters that indicate the current state of the portable device 100, for example, a battery charge percentage, an intensity of a received signal, a current time, or the like.

A home button 161*a*, a menu button 161*b*, and a back button 161*c* may be formed on a lower end of the touch screen 190.

The home button 161*a* displays the main home screen on the touch screen 190. For example, when the home button 161*a* is selected in a state in which a home screen different from the main home screen or the menu screen is displayed on the touch screen 190, the main home screen is displayed on the touch screen 190. Further, when the home button 161*a* is selected while applications are executed on the touch screen 190, the main home screen shown in FIG. 2 is displayed on the touch screen 190. In addition, the home button 161*a* may be used to display recently used applications or a task manager on the touch screen 190.

The menu button 161*b* provides a connection menu which can be displayed on the touch screen 190. The connection menu includes a widget addition menu, a background changing menu, a search menu, an editing menu, an environment setup menu and the like.

The back button 161*c* can be used for displaying the screen which was executed just before the currently executed screen or terminating the most recently used application.

The first camera 151, the luminance sensor 170*a*, and the proximity sensor 170*b* may be disposed on edges of the front surface of the portable device 100. The second camera 152, the flash 153, and the speaker 163 may be disposed on a rear surface 103 of the portable device 100.

For example, a power/reset button 161*d*, volume buttons 161*e* having a volume increase button 161*f* and a volume decrease button 161*g*, a terrestrial DMB antenna 141*a* for broadcasting reception, and one or a plurality of microphones 162 may be disposed on a side surface 102 of the portable device 100. The DMB antenna 141*a* may be fixed or detachably mounted on the portable device 100.

Further, the connector 165 may be formed on a lower side surface of the portable device 100. A plurality of electrodes are formed in the connector 165, and the connector 165 can be connected to the external device through a wire. On the top side surface of the portable device 100, an earphone connecting jack 167 may be formed. Earphones may be inserted into the earphone jack 167.

Further, the input unit 168 may be mounted to a side surface of a lower end of the portable device 100. The input unit 168 can be inserted in the portable device 100 to be stored in the portable device 100, and can be withdrawn and separated from the portable device 100 when it is used.

The above-configured portable device 100 is very useful to a user due to a great portability and various functions, whereas notification messages such as push notification messages, pop-up messages, SMS and MMS tend to disturb the user, to thereby deteriorate his or her concentration, which sometimes leads to inordinate use of the portable device.

In order to prevent the above problems, the portable device 100 deactivates at least some functions of the portable device 100 in accordance with the user request or setting in using the portable device 100, which will be described hereinafter. As an example, an operation of deactivating or ignoring the execution of an application, a display of notification messages, and/or pop-up messages will be described.

A controller 110 controls a general operation, more specifically, other elements of the portable device 100, to thereby deactivate some functions of the portable device 100 according to the embodiment of the present disclosure.

The portable device, especially a smart phone employs and performs a variety of applications installed therein by the user request or other conditions.

Figure 4:
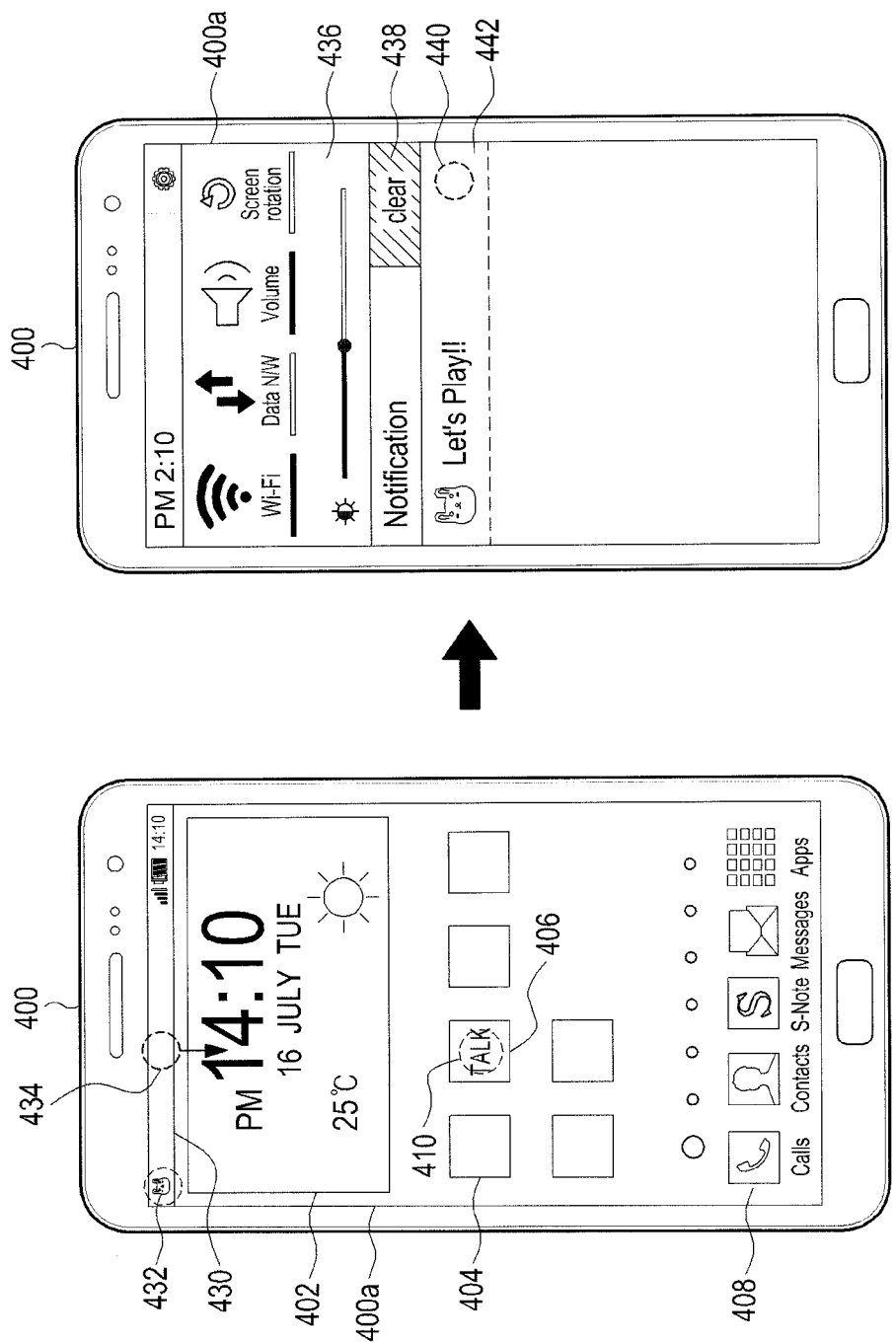
FIG. 4 illustrates User Interfaces (UIs) for executing an application in a smart phone in accordance with an embodiment of the present disclosure.

FIG. 4 illustrates User Interfaces (UIs) for executing an applications of a smart phone according to an embodiment of the present disclosure.

Referring to FIG. 4, the portable device 400 provides a home screen on a display screen 400*a*, wherein the home screen may include at least one page including at least one widget 402 and one or more icons 404 and 406 representing applications. In addition, a dock area 408 including icons of functions frequently used, such as a phone call function, an address book function, an SMS function, an internet function and an application menu function, is displayed at the bottom of the home screen.

When the portable device 400 detects a user's gesture, for example, a touch on any one of the widget 402 or icons 404 and 406 in the home screen, or on icons in the dock area 408, the application associated with the widget or icons is executed in response to the touch. In the embodiment of FIG. 4, the portable device 400 detects a touch 410 on the icon 406 representing an instant messenger and executes the instant messenger to thereby display an execution screen of the instant messenger on the display screen 400*a* (not shown).

Although not shown in the drawings, the portable device 400 may display an application menu including a plurality of icons associated with a plurality of applications installed in the portable device 400 on the display screen 400*a*. When a touch on the icon representing, e.g., the instant messenger of the applications menu is detected, the portable device 400 executes the instant messenger to display the execution screen of the instant messenger on the display screen 400*a* (not shown).

Also, the portable device 400 may receive a push notification message with regard to any one of the applications installed in the portable device 400 from a network, and then presents a notification symbol 432, which is a small image indicating that the push notification message has been received, in the status bar 430 located at the upper portion of the display screen 400*a*. In accordance with an embodiment of the present disclosure, the notification symbol 432 may be implemented into the image representing the related application. Moreover, the portable device 400 may carry out activities, for example, alert tone, vibration, display of pop-up message, etc., in order to inform that the push notification message has been received.

When a user gesture, for example, a downward touch-and-drag 434 on the status bar 430 is detected, the portable device 400 presents a quick panel 436 enabling simple settings for functions of the portable device 400 and a notification window 438 on the display screen 400*a*. The quick panel 436 provides menu buttons for Wi-Fi, on/off of data network, volume control, change of screen rotation, adjustment of brightness of display, etc.

The notification window 438 includes a notification line 442 showing the text of the received push notification message in detail. When a touch 440 on the notification line 442 is detected, the portable device 400 deletes the push notification message and carries out an activity. In an embodiment of the present disclosure, with the touch detected on the notification line 442 of the push notification message with regard to a game application, the portable device 400 may execute the game application to thereby provide the corresponding game contents on the display screen 400a (not shown).

Although not illustrated in the drawings, the portable device 400 may enable the user to access and choose an execution application by using another application such as a launcher and a file explorer.

The portable device is configured to download and install the applications from a network or from local computers. An application developer may make a push messaging service to be included in the application. An application server may transmit a notification message to the portable device installed with the application through a push messaging server. The push messaging server receives the notification message from the application server, and then transmits the same to a registered portable device.

In an embodiment of the present disclosure, a message receipt notification of an instant messenger, an invitation of game application and an advertisement notification of a subscription-based application may be transmitted to the portable device through the push notification message as mentioned above.

Hereafter, another embodiment in accordance with the present disclosure will be described, wherein the portable device deactivates irrelevant applications, and especially, blocks the user interface capable of accessing the applications. Hereinafter, a mode in which the use of portable device is restricted as the above is referred to as a concentration improvement mode.

The portable device blocks all user interfaces leading to at least one application in the concentration improvement mode. In an embodiment of the present disclosure, the portable device hides icons of applications from the application list, from the home screen, from the launcher, from the file explorer, or the like. In another embodiment of the present disclosure, the portable device blocks, i.e., ignores, the push notification messages received from the network and the pop-up messages generated in the portable device in relation to applications, and does not output image symbols or an alert tone informing that the messages have occurred. The application for restricting the use of portable device in the concentration improvement mode may be set up as a default or by the user.

The concentration improvement mode may be activated by setting up the portable device, or by executing an application of concentration improvement mode installed in the portable device. Now, a concentration improvement mode will be described in terms of a setup and activation/deactivation thereof.

Figure 5:
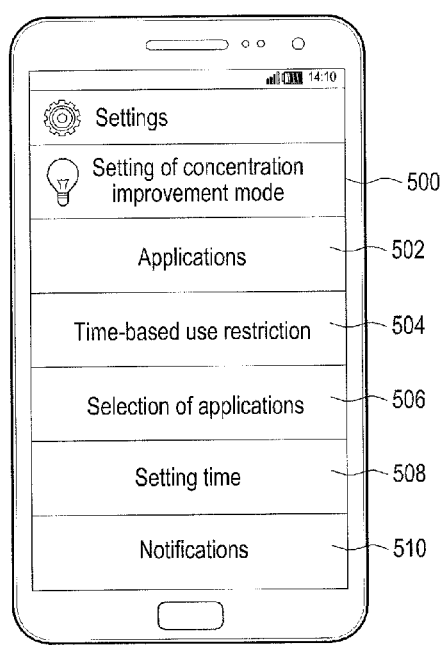
FIG. 5 illustrates a setting menu of a concentration improvement mode in accordance with an embodiment of the present disclosure.

FIG. 5 illustrates a setting menu of a concentration improvement mode in accordance with an embodiment of the present disclosure.

Referring to FIG. 5, the illustrated setting menu 500 may be provided by setting up the portable device or by executing the application for the concentration improvement mode. The portable device may display the illustrated setting menu 500 on the screen in response to a request from the user as shown in the drawing.

In FIG. 5, the setting menu 500 includes at least one of an "Applications" item 502 for restricting the use of applications, and a "Notifications" item 510 for restricting the receipt of notifications for the concentration improvement mode. The "Applications" item 502 includes a "Time-based use restriction" item 504 that restricts the use of predefined application(s) for a certain period of time. The "Time-based use restriction" item 504 includes at least one of a "Selection of applications" item 506 and a "Setting time" item 508.

The "Selection of applications" item 506 is used to appoint at least one application, use of which is to be restricted by the user. The "Setting time" item 508 enables the user to set the amount of time, for which the use of the appointed application is to be restricted.

Figure 6:
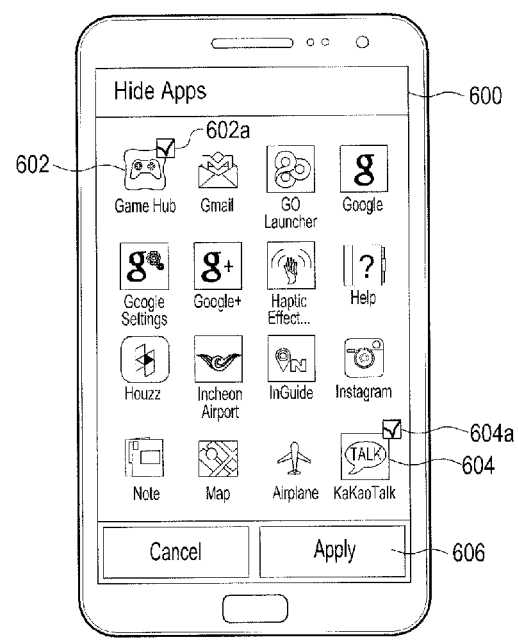
FIG. 6 illustrates a screen for selecting an application and setting time of a concentration improvement mode according to an embodiment of the present disclosure.

FIG. 6 illustrates a screen for selecting an application and setting time of a concentration improvement mode according to an embodiment of the present disclosure.

Referring to FIG. 6, when a user's gesture, for example, a touch on the "Selection of applications" item 506 of the setting menu 500 in FIG. 5 is detected, the portable device presents the application list 600 to be restricted on the screen to be displayed. As shown in the drawing, the application list 600 provides icons 602 and 604 arranged in the form of a lattice. In accordance with an embodiment of the present disclosure, the portable device may display all icons representing the applications installed in the portable device. In accordance with another embodiment of the present disclosure, the portable device may display icons representing applications supporting the receipt of notifications. In accordance with still another embodiment of the present disclosure, the portable device may display all icons of the applications installed in the portable device by the user. In a case in which the concentration improvement mode is supported by its dedicated application, the icon of the concentration improvement mode should be excluded from the application list 600. In accordance with still another embodiment of the present disclosure, the application list 600 can be displayed in various forms of text and small icons, etc.

When a user's gesture, for example, a touch on any one of the icons 602 and 604 in the application list 600 is detected, the portable device lets small markers 602a and 604a appear at the upper end of the icons 602 and 604, indicating that the icons 602 and 604 are selected by the user. In the present embodiment, icons of "Game Hub" and "KaKao Talk" are selected for restriction in use of them. When a touch on a soft key 606, for example, an "Apply" button, which is provided at the bottom of the application list 600 to complete setting, is detected, the portable device stores information of the applications corresponding to the selected icons 602 and 604, and removes the application list 600 from the screen to then return to the setting menu 500. The information of applications may include at least one of, e.g., the identification information of an application applicable to the concentration improvement mode, a name, a recording place, corresponding icons, the recording place of the corresponding icons, or the like.

Figure 7:
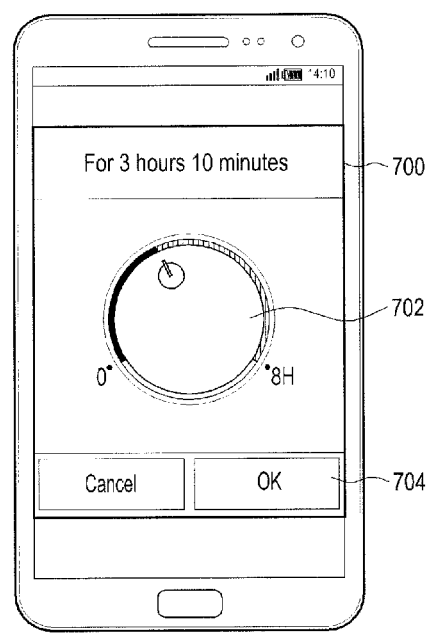
FIG. 7 illustrates a screen for selecting an application and setting time of a concentration improvement mode according to an embodiment of the present disclosure.

FIG. 7 illustrates a screen for selecting an application and setting time of a concentration improvement mode according to an embodiment of the present disclosure.

Referring to FIG. 7, when a user's gesture, for example, a touch on the "Setting time" item 508 of the setting menu 500 in FIG. 5, is detected, the portable device displays a time setting screen 700 on the display screen to set the amount of time for which the concentration improvement mode is to be activated. In the illustrated embodiment, the time setting screen 700 includes a circular dial 702 which enables a user to set the amount of time in the range of 0 to 8 hours. When the dial 702 is rotated in response to a touch-and-rotational movement of the user, the amount of time corresponding to the rotation, for example, 3 hours and 10 minutes, is displayed at the upper portion of the time setting screen 700. When a touch on a soft key, e.g., "OK" button 704, which is provided at the bottom of the time setting screen 700 to complete the setting, is detected, the portable device stores the amount of time as set above, and removes the time setting screen 700 from the screen to then return to the setting menu 500.

The portable device may complete the setup of the concentration improvement mode in response to a detection of a user's gesture, for example, a touch on a back button (see 161c of FIG. 2) after returning to the setting menu 500 or in the presence of the setting menu 500, or in response to a pressing of a home button (see 161a of FIG. 2) in the presence of the setting menu 500. According to another embodiment of the present disclosure, the setting menu 500 may provide a soft key, e.g., a "Start of concentration improvement mode" button for completing the setup of the concentration improvement mode and starting the same, wherein the portable device can complete the setup for the concentration improvement mode upon the detection of a user's gesture, e.g., the touch on the "Start of concentration improvement mode" button.

Once the setup of the concentration improvement mode is completed, as mentioned above, the concentration improvement mode is activated in a preset period of time, for example, for 3 hours and 10 minutes, from the time point when the setup is completed. The selected applications are restricted in usage under the concentration improvement mode. In another embodiment of the present disclosure, the setting menu may further include a "Start of concentration improvement mode" item for activating the concentration improvement mode. In this case, when a user's gesture, e.g., a touch on the "Start of concentration improvement mode" item is detected, the portable device initiates the concentration improvement mode.

During the concentration improvement mode, the portable device hides or deactivates the icons representing the selected applications from the home screen, the application menu, the launcher, the file explorer, etc. The portable device may also prevent the push notification messages received from the network and the pop-up messages generated in the portable device with respect to the selected applications from being displayed on the screen, and may not output the alert tone for the messages. In another embodiment, the push notification messages and the pop-up messages are stored to be presented on the screen after the concentration improvement mode is deactivated.

Figure 8:
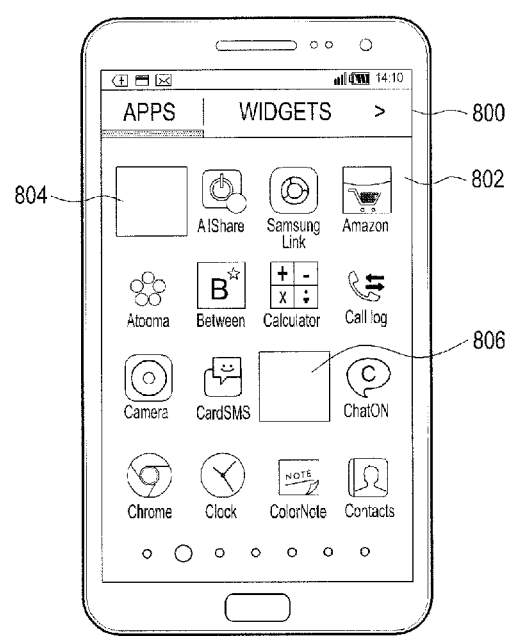
FIG. 8 illustrates an application menu when a concentration improvement mode has been activated according to an embodiment of the present disclosure.

FIG. 8 illustrates an application menu when the concentration improvement mode is activated according to an embodiment of the present disclosure.

Referring to FIG. 8, the portable device displays an application menu 802 which includes icons representing a plurality of applications on the screen 800. Here, the icons representing the applications that have been selected to be restricted in usage under the concentration improvement mode are not shown, i.e., hidden from the application menu 802 to be thereby left as blanks 804 and 806 or become translucent, i.e., deactivated. The portable device ignores the selection, i.e., a click or a touch, of the deactivated icons, and does not execute the applications corresponding to the icons. In accordance with another embodiment of the present disclosure, the application menu 802 may include icons of applications except for the use-restricted applications, while the blank or deactivated icons of the restricted applications may not be shown.

Figure 9:
FIG. 9 illustrates a status bar when a concentration improvement mode has been activated according to an embodiment of the present disclosure.

FIG. 9 illustrates a status bar when a concentration improvement mode is activated according to an embodiment of the present disclosure.

Referring to FIG. 9, the portable device may display an indicator 902, for example, an image symbol indicating that the concentration improvement mode is being activated, in a status bar 900. When a downward touch-and-drag 904 on the status bar 900 is detected, the portable device may present a quick panel and a notification window on the screen.

Figure 10:
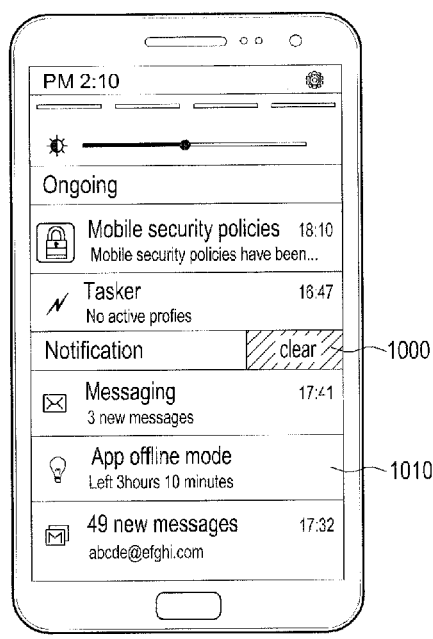
FIG. 10 illustrates a notification window when a concentration improvement mode has been activated according to an embodiment of the present disclosure.

FIG. 10 illustrates a notification window when a concentration improvement mode is activated according to an embodiment of the present disclosure.

Referring to FIG. 10, under the concentration improvement mode, a notification window 1000 may include a notification line 1010 indicating that the concentration improvement mode is set to be activated in three hours and ten minutes. The notification line 1010 may include text, for example, "Concentration improvement mode has been activated" or "Concentration improvement mode will terminate in 3 hours 10 minutes". In an embodiment of the present disclosure, when a user's gesture, for example, a touch on the notification line 1010 is detected, the portable device may display a setting menu of the concentration improvement mode on the screen. In another embodiment of the present disclosure, when a touch on the notification line 1010 is detected, the portable device may display a user interface for deactivating the concentration improvement mode on the screen.

In still another embodiment of the present disclosure, the portable device may restrict all functions, including phone calls and the execution of applications, of the portable device instead of the selection of applications to be restricted under the concentration improvement mode, but may allow emergency calls. In this case, the setting menu may not include the "Selection of applications" item. In the concentration improvement mode in accordance with another embodiment of the present disclosure, the portable device may consistently display a blocked status guide screen, or may display the deactivated home screen, wherein the portable device does not respond to a user's input through the blocked status guide screen, the deactivated home screen or the physical buttons. In an embodiment of the present disclosure, the blocked status guide screen or the deactivated home screen may include a soft key of "Deactivation of use restriction", and the portable device may display a user interface for deactivation on the display screen in response to the request for deactivation of use restriction by the soft key. In another embodiment of the present disclosure, the portable device may display the user interface for deactivation on the screen in response to the input by means of one of physical buttons, for example, a menu button or a back button from the user. Also, in the present embodiment, under the concentration improvement mode, the portable device may block or ignore the notification messages received from the outside or generated in the portable device, and may store the messages in the memory, whereas the portable device may not display the image symbol indicating that the messages have been received or generated on the screen. In addition, the portable device may not present the alert tone or vibration to inform that the messages have been received or generated.

The concentration improvement mode may be automatically deactivated after the lapse of a preset time, preferably, with the pop-up message of, for example, "Concentration improvement mode is deactivated" on the screen.

According to an embodiment of the present disclosure, the portable device may enable the user to deactivate the concentration improvement mode at any time by means of the setting menu of the concentration improvement mode.

Figure 11:
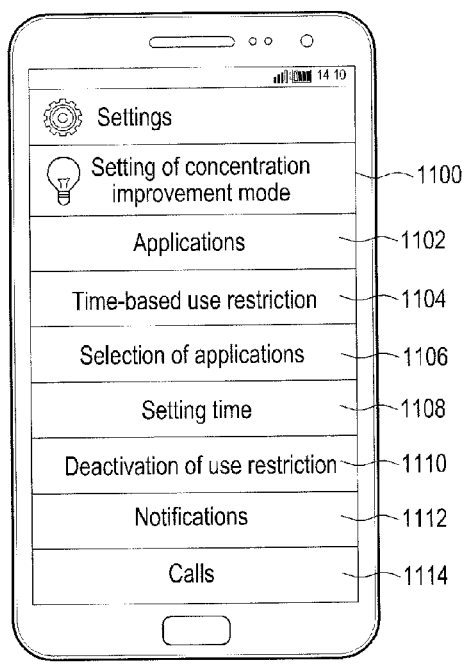
FIG. 11 illustrates a setting menu of a concentration improvement mode including deactivation of use restriction according to an embodiment of the present disclosure.

FIG. 11 illustrates a setting menu of a concentration improvement mode including deactivation of use restriction according to an embodiment of the present disclosure. As shown in the drawing, the setting menu 1100 is similar to that of FIG. 5 with the exception of further including a "Deactivation of use restriction" item 1110.

Referring to FIG. 11, the setting menu 1100 includes an "Applications" item 1102, a "Notifications" item 1112, and a "Calls" item 1114 for restricting sending/receiving of phone calls. The "Applications" item 1102 includes a "Time-based use restriction" item 1104, and the "Time-based use restriction" item 1104 further includes a "Selection of applications" item 1106, a "Setting time" item 1108 and a "Deactivation of use restriction" item 1110. In addition, the setting menu 1100 may further include a "Setting password" item (not shown) to authenticate the deactivation of use restriction.

The "Deactivation of use restriction" item 1110 may allow the user to instantly deactivate the concentration improvement mode and use an appointed application. According to an embodiment of the present disclosure, when the concentration improvement mode is not activated, the "Deactivation of use restriction" item 1110 may remain deactivated, i.e., translucent. On the contrary, when the concentration improvement mode is activated, the remaining items 1106 and 1108 except for the "Deactivation of use restriction" item 1110 may remain deactivated, i.e., translucent. Then, the portable device does not respond to a user's gesture or input through the deactivated items.

When a user's gesture, for example, a touch on the "Deactivation of use restriction" item 1110 is detected, the portable device provides a user interface for deactivating the concentration improvement mode on the screen.

Figure 12:
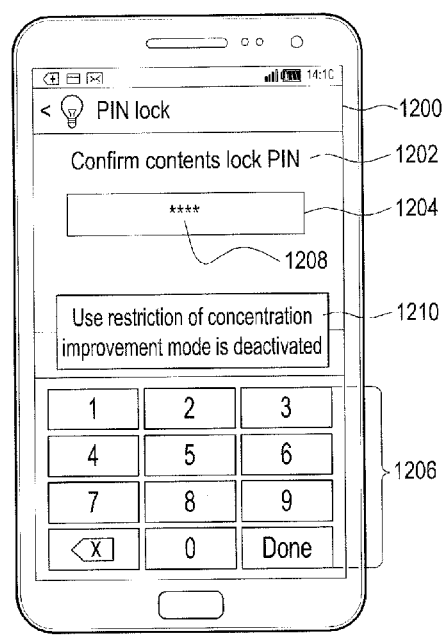
FIG. 12 illustrates a screen for deactivating a concentration improvement mode according to an embodiment of the present disclosure.

FIG. 12 illustrates a user interface for deactivating a concentration improvement mode according to an embodiment of the present disclosure.

Referring to FIG. 12, when a user's touch on the "Deactivation of use restriction" item 1110 of the setting menu 1100 in FIG. 11 is detected, the portable device provides a user interface 1200 for deactivating the concentration improvement mode on the screen. In the drawing, the user interface 1200 includes a text 1202 that tells the user to input a Personal Identification Number (PIN), an input field 1204 for displaying an input PIN, and a virtual keypad 1206 for typing the PIN. The virtual keypad 1206 includes, for example, alphabet/number keys, a Delete key and a Done key, and the input field 1204 shows a hidden PIN 1208, for example, under asterisks, corresponding to the PIN input through the virtual pad 1206.

If the PIN entered by the virtual keypad 1206 is the same as the preset PIN for deactivation of the concentration improvement mode, the portable device deactivates the concentration improvement mode, presenting a pop-up window 1210 informing that the concentration improvement mode has been deactivated on the screen. The preset PIN may be set up by, for example, a "Setting PIN" item of the setting menu 1100. With the concentration improvement mode deactivated, the portable device returns to the setting menu 1100 or the previous screen (e.g., home screen).

After the use restriction of the portable device is released, the portable device allows the use and execution of the applications which have been selected for restriction under the concentration improvement mode. Specifically, the portable device presents the icons representing the selected applications to the home screen, the application menu, the launcher and the file explorer to be thereby displayed again. Also, the portable device may display the push notification messages received from the network and the pop-up messages generated in the portable device with respect to the selected applications, and output the alert tone for the messages.

Figure 13:
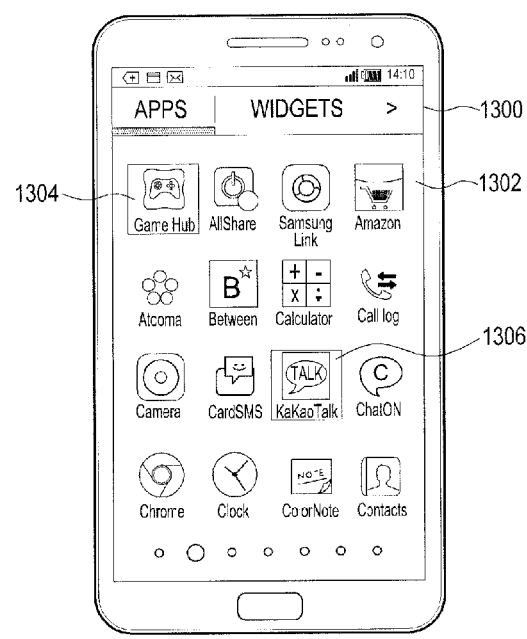
FIG. 13 illustrates an application menu when a concentration improvement mode has been deactivated according to an embodiment of the present disclosure.

FIG. 13 illustrates an application menu when a concentration improvement mode is deactivated according to an embodiment of the present disclosure.

Referring to FIG. 13, the portable device displays the application menu 1300 on the screen, and the application menu 1300 includes a plurality of application icons 1302 including the icons 1304 and 1306 of the applications that have been selected for restriction in usage.

According to an embodiment of the present disclosure, the portable device can set a limit to the number of chances that the user can deactivate the concentration improvement mode, to prevent overuse of the deactivation function. For example, deactivation of the concentration improvement mode may be limited to three times a day, while the limit of the number of chances may be set as a default or set by the user by means of a setting menu.

If the number of times for deactivation of the concentration improvement mode reaches the limit value, the portable device will not allow the deactivation of the concentration improvement mode anymore, so that the concentration improvement mode can be deactivated only after the lapse of the preset time.

When a user's touch on the "Deactivation of use restriction" item 1110 of the setting menu 1100 is detected, the portable device provides a user interface for deactivating the concentration improvement mode on the screen. At the same time, the portable device may temporarily display a pop-up message such as, for example, the text of "One time left for deactivation" or "Cannot deactivate due to limit being met", and giving the information of the number of chances for deactivation of the concentration improvement mode on the screen.

In case of the pop-up message informing that the concentration improvement mode can be deactivated, the pop-up message disappears after a time automatically or by a user input trigger, and then the user may enter the PIN through a screen for deactivation of the concentration improvement mode. On the contrary, the pop-up message informing that the concentration improvement mode cannot be deactivated disappears after an amount of time automatically or by a user input trigger, and then the portable device returns to the setting menu or the previous page of screen (e.g., home screen).

If the PIN entered in the user interface for deactivation is not the same as the preset PIN, the portable device presents a pop-up message such as, for example, the text of "Failed to deactivate due to incorrect PIN", informing that the deactivation is failed on the screen, and remains in the concentration improvement mode.

In an alternative embodiment of the present disclosure, the portable device may display a balance of the amount of time for the concentration improvement mode and/or the number of chances left for deactivation on a notification line 1010 of the notification window (e.g., 1000 of FIG. 10).

Figure 14A:
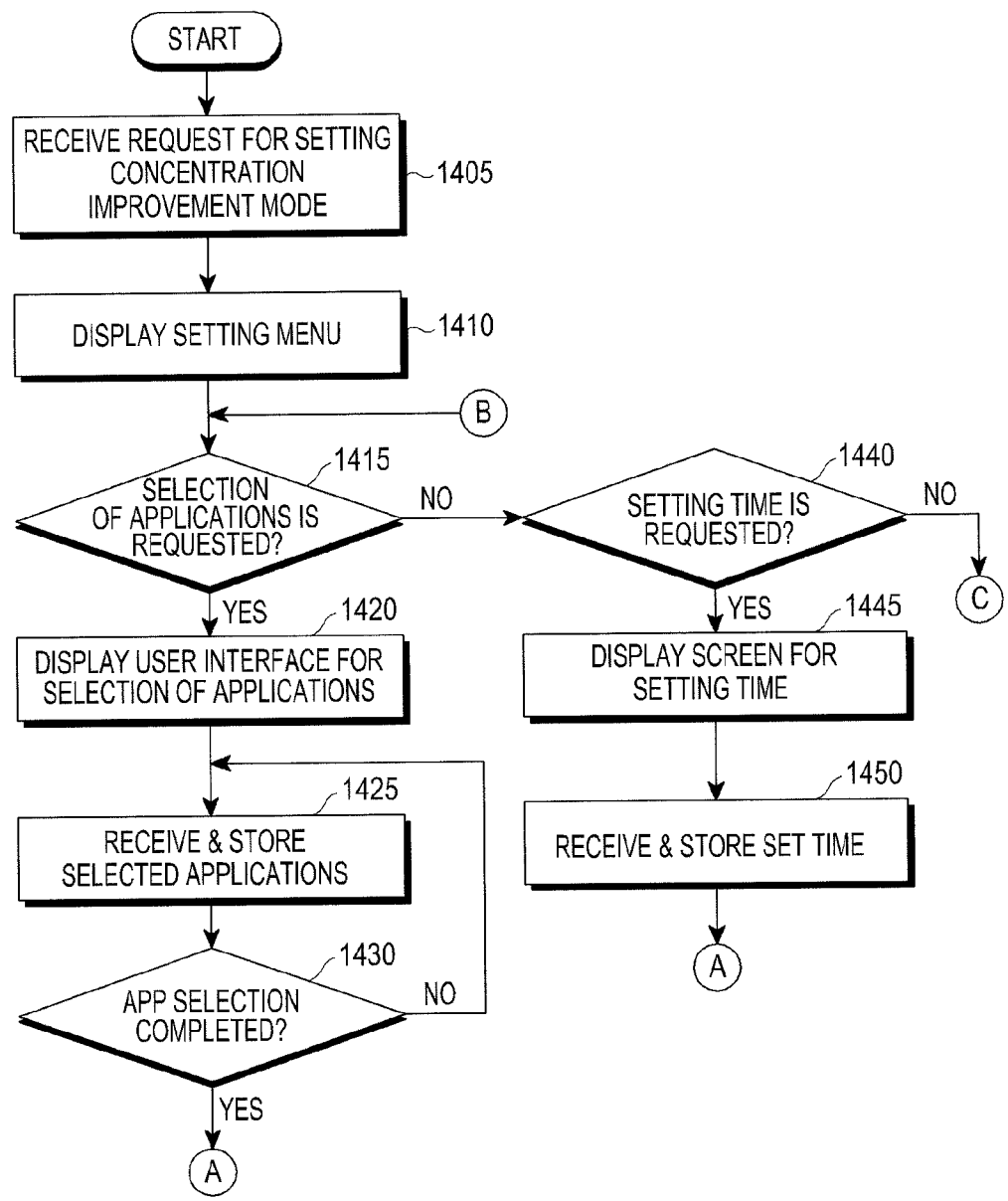
FIGS. 14A and 14B are flowcharts illustrating a process of restricting use of a smart phone according to an embodiment of the present disclosure.
Figure 14B:
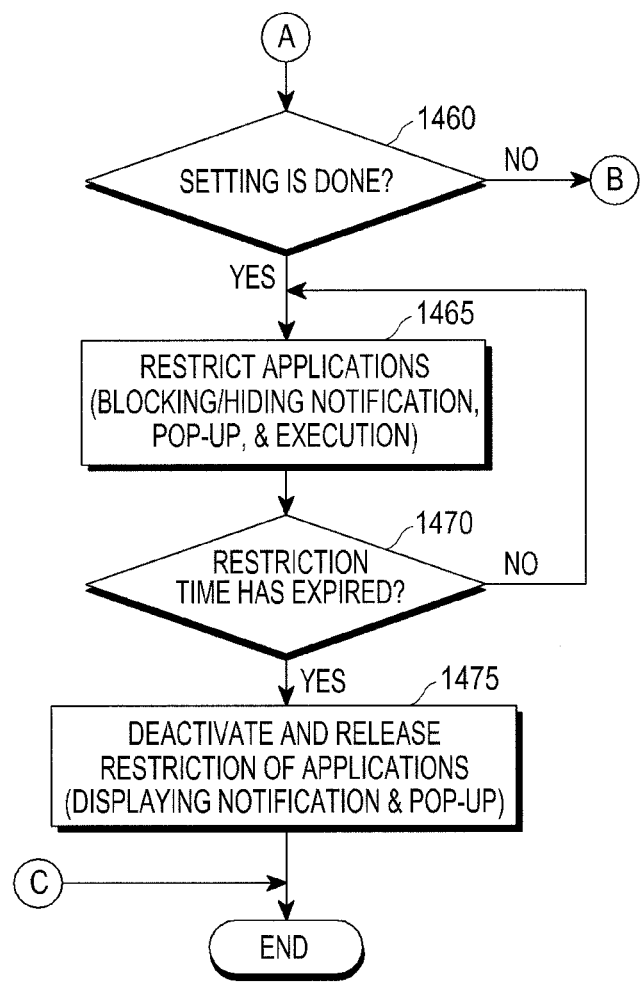

FIGS. 14A and 14B are flowcharts illustrating a process for restricting the use of the portable device according to an embodiment of the present disclosure.

Referring to FIG. 14A, in operation 1405, the portable device receives a request for activation of the concentration improvement mode from a user in order to restrict the use of the portable device. In an embodiment of the present disclosure, the portable device may receive the request for the concentration improvement mode by means of the setting menu or the execution of the exclusive application for the concentration improvement mode. In operation 1410, the portable device displays the setting menu for the concentration improvement mode in response to the request for activation on the screen thereof.

In operation 1415, the portable device determines whether the selection of applications is requested in the setting menu. For example, when a touch on the "Selection of applications" item 506 is detected, the portable device concludes that the selection of applications has been requested, to thereby proceed to operation 1420, and otherwise the portable device proceeds to operation 1440.

In operation 1420, the application list 600 including icons of applications which are able to be selected to be restricted is displayed in a user interface on the display screen 400a of the portable device. In operation 1425, the portable device receives, by detecting the user input, a selection of at least one application of the application list 600, and stores the information of the selected application in response to the user input. In operation 1430, if the portable device receives the user input that the selection of application is completed, it proceeds to operation 1460 of FIG. 14B, and otherwise the portable device returns to operation 1425 to continue to select the applications to be restricted. For example, the portable device presents the "Apply" button 606 at the bottom of the application list 600. If a touch on the "Apply" button 606 is detected, the sequence returns to operation 1410.

In operation 1440, the portable device determines whether the setting of the amount of time (referred to as a restriction time hereinafter) during which the use of the portable device is restricted under the concentration improvement mode is requested or not. For example, when a touch on the "Setting time" item 608 of the setting menu is detected, the portable device concludes that the setting of the restriction time has been requested, to thereby proceed to operation 1445, and otherwise the portable device terminates the setting process.

In operation 1445, the user interface of "Setting time" for setting the restriction time is displayed on the screen of the portable device. In operation 1450, the portable device is provided with the restriction time by a user input through the user interface of "Setting time", and stores the information of the restriction time to proceed to operation 1460.

Referring to FIG. 14B, the portable device determines whether the setting of the concentration improvement mode is completed in operation 1460. For example, the portable device displays the setting menu including a "Done" button at the bottom thereof, and concludes that the setting of the concentration improvement mode has been completed upon the detection of a touch on the "Done" button.

In another embodiment of the present disclosure, if the "Back" button is pressed in the presence of the setting menu on the screen, the portable device may conclude that the setting of the concentration improvement mode is completed.

If it is concluded that the setting of the concentration improvement mode has not been completed, the portable device returns to operation 1415. Contrarily, when the setting of the concentration improvement mode has been completed, the sequence proceeds to operation 1465.

In operation 1465, the portable device restricts the use of the selected applications under the concentration improvement mode for the restriction time. If the user requests starting of the concentration improvement mode without setting of a restriction time or input of a selected application, the portable device may restrict the default applications for a period of time set as default under the concentration improvement mode. More specifically, the portable device hides the icons of the selected applications from the home screen, the application menu, the launcher, the file explorer, and the like. The portable device prevents the push notification messages received from the network and the pop-up messages generated in the portable device with respect to the selected applications from being displayed on the screen of the portable device, and does not output the alert tone for the messages as well.

In operation 1470, the determination is made to whether the restriction time of the concentration improvement mode has expired. If the restriction time has not expired, the portable device returns to operation 1465 to keep the concentration improvement mode activated. When the restriction time has expired, the portable device deactivates the concentration improvement mode to release the restriction of the applications in usage in operation 1475.

At the time when the concentration improvement mode is deactivated, the portable device checks whether the push notification messages have been received from the network or the pop-up messages have been generated in the portable device with regard to the restricted applications during the activation of the concentration improvement mode. If there are any messages, the portable device may inform of the presence of the corresponding messages by means of the status bar or a pop-up message, and may output the alert tone or vibration for the messages as well.

Figure 15:
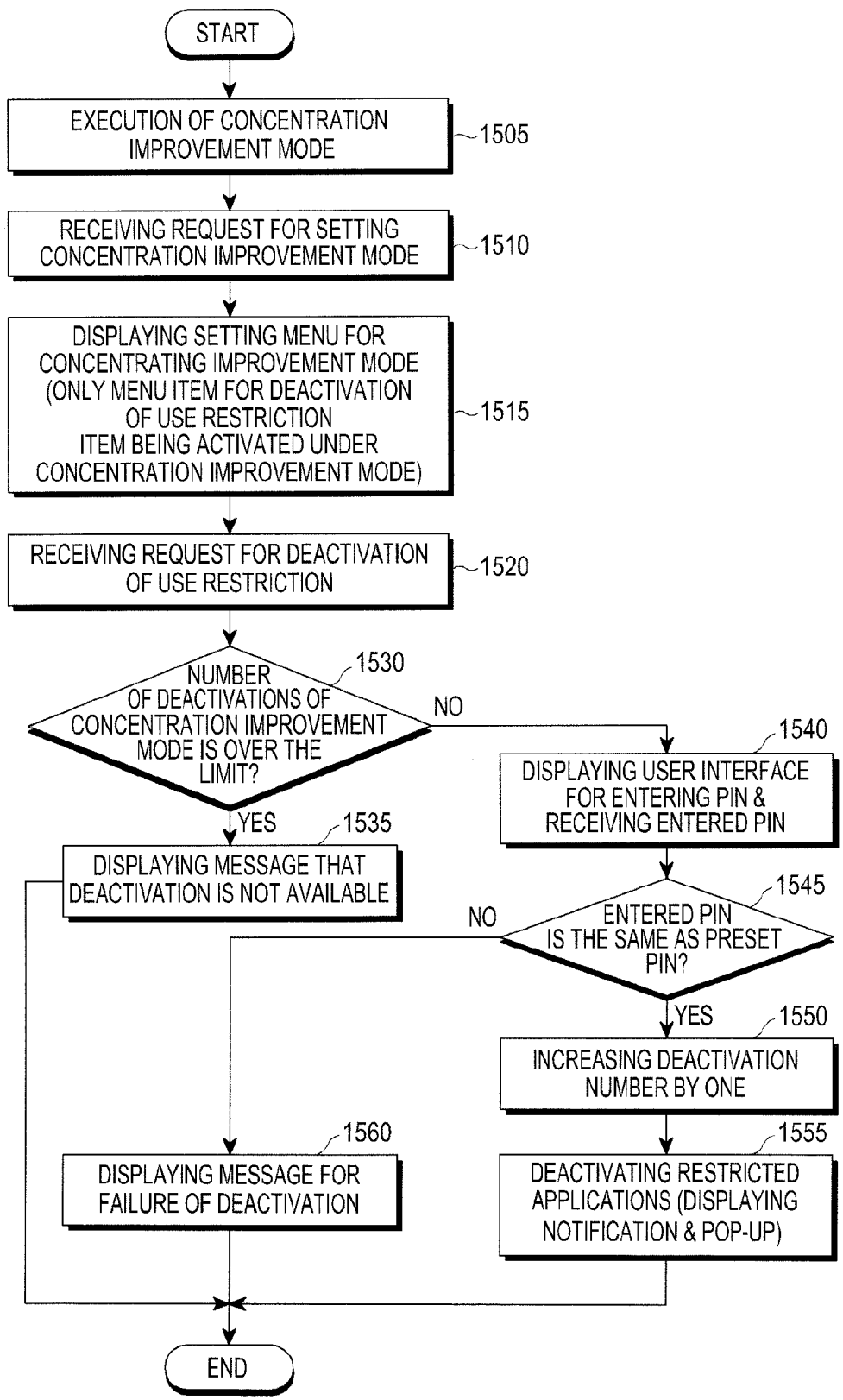
FIG. 15 is a flowchart illustrating a process of deactivating a concentration improvement mode according to an embodiment of the present disclosure.

FIG. 15 is a flowchart illustrating a process for deactivating a concentration improvement mode according to an embodiment of the present disclosure. In this embodiment, a process for deactivating the concentration improvement mode at any time before the restriction time expires will be described.

Referring to FIG. 15, in the middle of the concentration improvement mode in which the use of the portable device is being restricted as in operation 1505, the portable device receives the user request for setting the concentration improvement mode in operation 1510. In an embodiment of the present disclosure, the portable device may receive the request for the concentration improvement mode by means of the setting menu, the execution of application for the concentration improvement mode, or the notification line for informing of the activation of the concentration improvement mode.

In operation 1515, the portable device displays the setting menu 1100 for the concentration improvement mode in response to the request for setting on the screen. At this time, the remaining items except for a "Deactivation of use restriction" item 1110 may remain deactivated because the portable device is in the middle of the concentration improvement mode.

In operation 1520, the portable device receives a request for deactivation of the use restriction from the user in the setting menu 1100. For example, when a touch on the "Deactivation of use restriction" item 1110 of the setting menu is detected, the portable device concludes that the request for immediately deactivating the concentration improvement mode has been made, to thereby proceed to operation 1530, and otherwise the portable device returns to operation 1505.

In operation 1530, the portable device determines whether the number of times that the concentration improvement mode has been deactivated (referred to as a deactivation number hereinafter) is more than the predefined limit of the number of times (referred to as a limit number hereinafter). Here, the deactivation number means the number of times that the concentration improvement mode has been deactivated by the "Deactivation of use restriction" item of the setting menu after the activation of the concentration improvement mode. For example, in a case in which the concentration improvement mode is deactivated according to the restriction time, the deactivation number may be initialized to zero.

If the deactivation number is more than the limit number, the portable device displays a pop-up message such as, for example, the text of "Cannot deactivate the concentration improvement mode due to limit being met", informing that the deactivation is not available on the screen in operation 1535, and the process terminates.

If the deactivation number is less than or equal to the limit number, the portable device displays the user interface of deactivation for entering the PIN by the user on the screen in operation 1540. At the same time, the portable device may present a pop-up message, for example, "No more chance left for deactivation", informing the number of chances left for deactivation on the screen.

In operation 1545, the portable device determines whether the PIN entered by the user is the same as the preset PIN for deactivation of the concentration improvement mode. For example, the preset PIN may be set by means of a "Setting PIN" item of the setting menu 1100 of FIG. 11. If the PIN entered by the user is not the same as the preset PIN, the portable device proceeds to operation 1560 to provide a pop-up message such as, for example, the text of "Failed to deactivate due to incorrect PIN", informing of the failure of deactivation on the screen, and the process terminates. On the contrary, if the PIN entered by the user is the same as the preset PIN, the portable device proceeds to operation 1550 to increase the deactivation number by one, and then the concentration improvement mode is deactivated so that the use restriction of the portable device is released in operation 1555. At the same time, the portable device displays a pop-up message, e.g., "The concentration improvement mode has been deactivated" on the screen, and informs the user of the presence of the push notification messages or pop-up messages received during the concentration improvement mode.

Hereafter, another embodiment of the present disclosure will be described, in which the portable device prevents the execution of the selected applications and various events (e.g. the push notification or pop up message), that may disturb the user who is concentrating on a certain application of the portable device. As mentioned above, the mode in which the use and execution of applications except for the application desired by the user is restricted, is referred to as a multitasking restriction mode hereinafter.

The multitasking restriction mode may be provided as a sub-function of the concentration improvement mode as set forth or a separate function. Under the multitasking restriction mode, the portable device blocks the user input by the user interface, e.g., the status bar, the home button, the back button, etc, other than the user interface of the desired and concentrated application, and does not inform the user of the push notification messages from the network and the generated pop-up messages. That is, all kinds of the push notification messages and pop-up messages are blocked in the multitasking restriction mode. In the alternative embodiment of the present disclosure, no input or output may be allowed except for those for the desired application under the multitasking restriction mode. The applications applied to the multitasking restriction mode may be set as a default or selected by the user.

Figure 16:
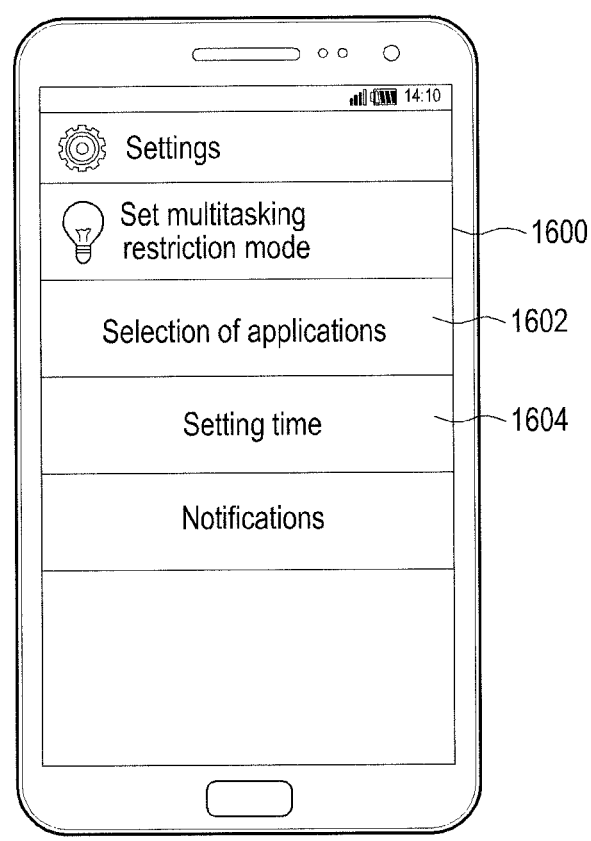
FIG. 16 illustrates a setting menu of a multitasking restriction mode according to an embodiment of the present disclosure.

FIG. 16 illustrates a setting menu of a multitasking restriction mode according to an embodiment of the present disclosure.

Referring to FIG. 16, a setting menu 1600 may be provided by setting the portable device or performing an exclusive application for the multitasking restriction mode. Alternatively, the setting menu 1600 of the multitasking restriction mode may be provided as a sub-menu of the setting menu 600 or 1100 for the concentration improvement mode.

Referring to FIG. 16, the setting menu 1600 may include at least one of a "Selection of applications" item 1602 and a "Setting time" item 1604.

The "Selection of applications" item 1602 enables the user to select at least one application to be applied with the multitasking restriction mode. The "Setting time" item 1604 enables the user to set the amount of time that the multitasking restriction mode is to be applied to the selected application.

Figure 17:
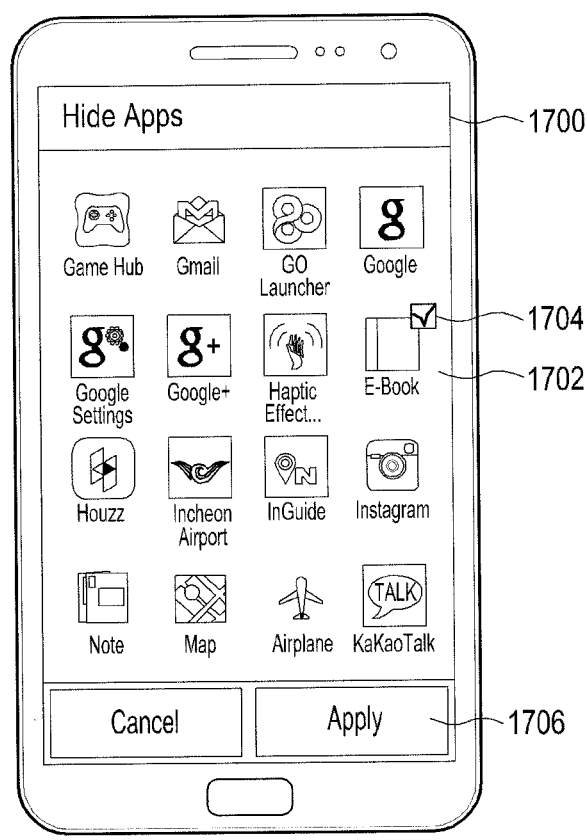
FIG. 17 illustrates a screen for selecting an application of a multitasking restriction mode according to an embodiment of the present disclosure.

FIG. 17 illustrates a user interface for selecting an application of a multitasking restriction mode according to an embodiment of the present disclosure.

Referring to FIG. 17, when a user's gesture, e.g., a touch on the "Selection of applications" item 1600 of the setting menu 1600 in FIG. 16 is detected, the portable device displays the application list 1700 to be applied with the multitasking restriction mode on the screen. As shown in the drawing, the application list 1700 provides icons of applications arranged in the form of a lattice. In accordance with an embodiment of the present disclosure, the portable device may display icons representing all of the internal applications of the portable device. In accordance with another embodiment of the present disclosure, the portable device may display icons representing applications available in the multitasking restriction mode. In accordance with still another embodiment of the present disclosure, the portable device may display icons of all the applications which are installed in the portable device by the user. In accordance with further another embodiment of the present disclosure, the application list 1700 can be displayed in various forms of text and small icons, etc.

When a user's gesture, for example, a touch on any one of the icons 1702 in the application list 1700 is detected, the portable device may let a small marker 1704 appear at the corner of the icons 1702, indicating that the icons 1702 are selected by the user. In the present embodiment, the icon of "E-Book" is selected for the multitasking restriction mode. When a touch on a soft key 1706, for example, an "Apply" button, which is provided at the bottom of the application list 1700 to complete setting, is detected, the portable device stores information of the application corresponding to the selected icons 1702, and removes the application list 1700 from the screen to thereby return to the setting menu 1600.

When a user's gesture, for example, a touch on the "Setting time" item 1604 of the setting menu 1600 in FIG. 16, is detected, the portable device provides a user interface for setting the amount of time that the multitasking restriction mode is to be activated on the screen. The configuration of the user interface and the process for setting a time may be accomplished in the same way as described in FIG. 7B.

Once the setup of multitasking restriction mode is completed as mentioned above, the multitasking restriction mode is activated upon the execution of the selected applications. The execution of applications and events are restricted except for the selected applications under the multitasking restriction mode.

Figure 18:
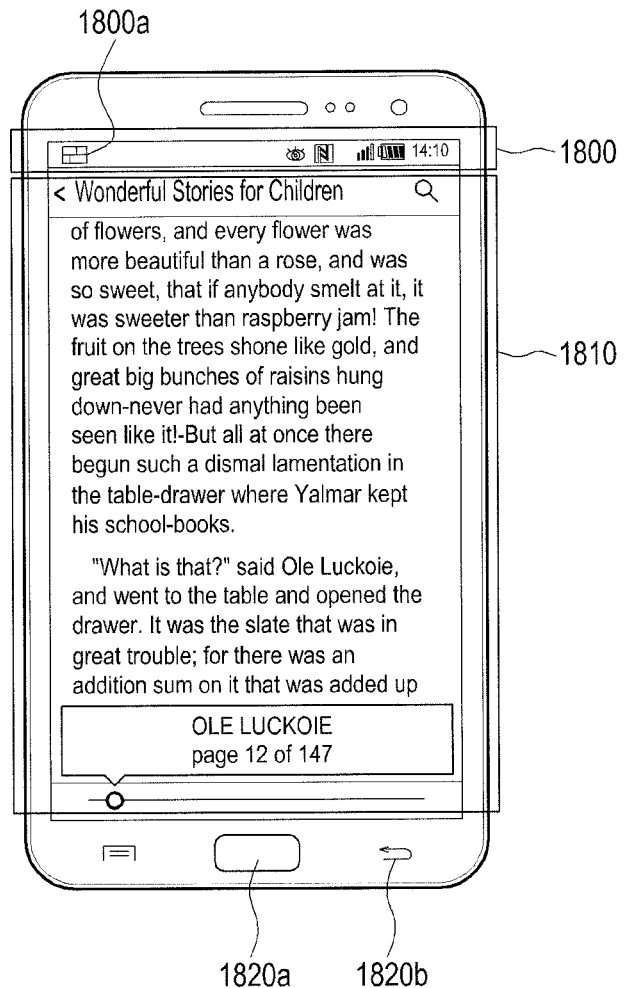
FIG. 18 illustrates a display on a screen when a multitasking restriction mode has been activated according to an embodiment of the present disclosure.

FIG. 18 illustrates a display on a screen when a multitasking restriction mode is activated according to an embodiment of the present disclosure.

Referring to FIG. 18, the selected application, for example, the "E-Book" application, for the multitasking restriction mode, is performed to thereby display the application contents on an execution screen area 1810 of the screen in the portable device. The user interface, e.g., a status bar 1800, in other screen area except for the execution screen area 1810 on the screen is blocked because the E-Book application is selected for the multitasking restriction mode. More specifically, even though a downward touch-and-drag on the status bar 1800 is detected, the portable device does not open the quick panel. Also, a home button 1820a and a back button 1820b become unavailable to prevent the conversion to another application. That is, although the home button 1820a is pressed or a touch on the back button 1820b is detected, the portable device takes no action. Then, the user is able to enjoy the E-Book application in the execution screen area 1810, for example, by changing pages of the E-Book contents or highlighting some phrases. In an embodiment of the present disclosure, the portable device may display an indicator 1800a, for example, an image symbol indicating the multitasking restriction mode is being activated, in a status bar 1800.

The multitasking restriction mode may be automatically deactivated after the lapse of a preset time, preferably, with the pop-up message of, for example, "Multitasking restriction mode is deactivated" on the screen, allowing the user input by the status bar 1800, the home button 1820a and the back button 1820b.

According to an embodiment of the present disclosure, the portable device may enable the user to deactivate the multitasking restriction mode at any time by means of the menu buttons.

Figure 19A:
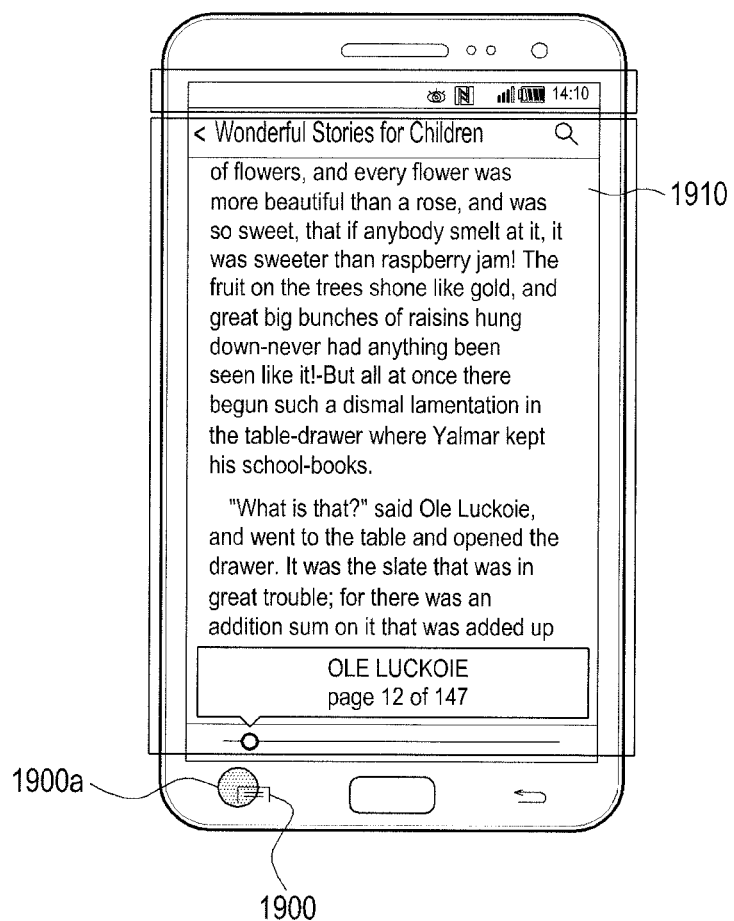
FIGS. 19A and 19B illustrate a display on a screen showing deactivation of a multitasking restriction mode according to an embodiment of the present disclosure.
Figure 19B:
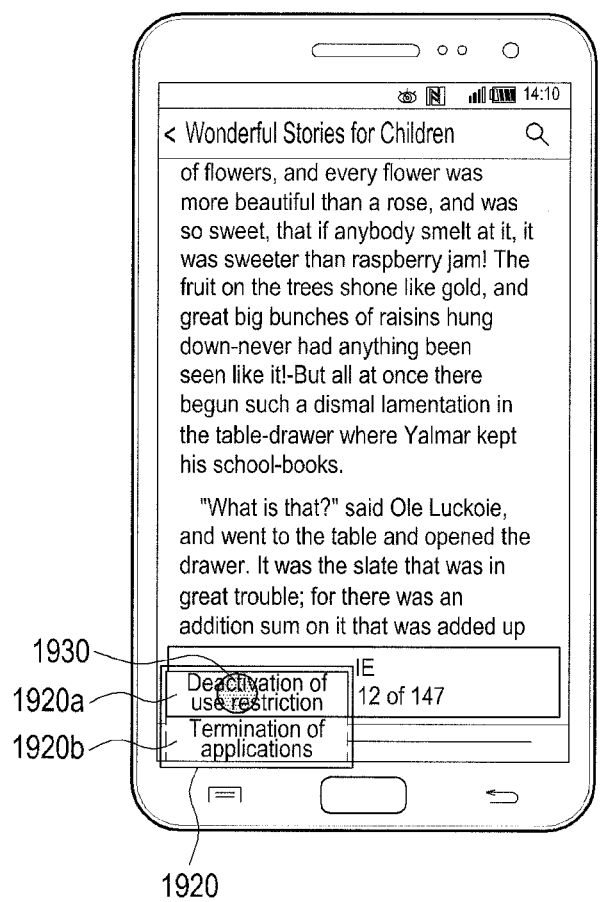

FIGS. 19A and 19B illustrate a display on a screen showing deactivation of a multitasking restriction mode according to an embodiment of the present disclosure.

Referring to FIG. 19A, when a user input 1900a, for example, a touch on the setting menu 1900 is detected with the E-Book application 1910 in progress under the multitasking restriction mode, the portable device displays a menu area 1920 as shown in FIG. 19B on the screen. The menu area 1920 may include "Deactivation of use restriction" item 1920a together with menu items provided by the E-Book application 1910. When the user input 1930, for example, a touch on the "Deactivation of use restriction" item 1920a is detected, the portable device provides a user interface for the PIN to be entered on the screen.

If the PIN entered by the user interface is the same as the preset PIN for deactivation of the multitasking restriction mode, the portable device may deactivate the multitasking restriction mode, presenting a pop-up window informing that the multitasking restriction mode has been released on the screen. The portable device allows the user input by the status bar 1800, the home button 1820a, and the back button 1820b after the multitasking restriction mode is deactivated.

Referring to FIG. 19B, the figure illustrates another embodiment of the present disclosure, in which the menu area 1920 of FIG. 19B may further include a "Termination of application" item 1920b. When a touch on the "Termination of application" item 1920b is detected, the portable device may terminate the corresponding application, e.g., the E-Book application and deactivate the multitasking restriction mode as well. Alternatively, the portable device may display a deactivation screen when a touch on the "Termination of application" item 1920b is detected.

Figure 20:
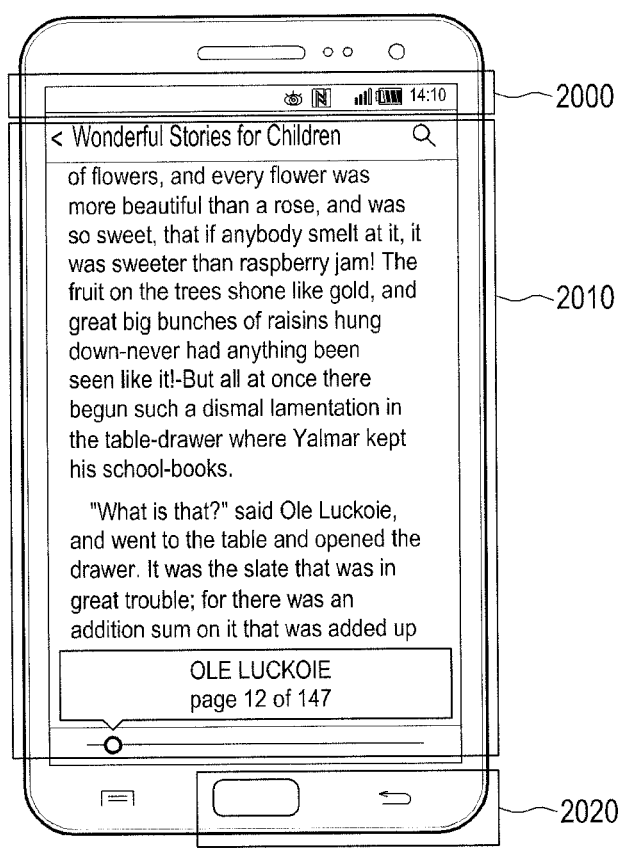
FIG. 20 illustrates a display on a screen showing the execution of an application when a multitasking restriction mode has been deactivated according to an embodiment of the present disclosure.

FIG. 20 illustrates a display on a screen showing the execution of an application when a multitasking restriction mode is deactivated according to an embodiment of the present disclosure.

Referring to FIG. 20, the portable device presents an execution screen area 2010 for the application on the screen, and responds to the user input by a status bar 2000 and physical buttons 2020. More specifically, when a downward touch-and-drag on the status bar 1800 is detected, the portable device opens a quick panel and a notification window. Also, when the home button is pressed or a touch on the back button is detected, the portable device performs the corresponding function such as, for example, conversion to the home screen and termination of the application.

Figure 21:
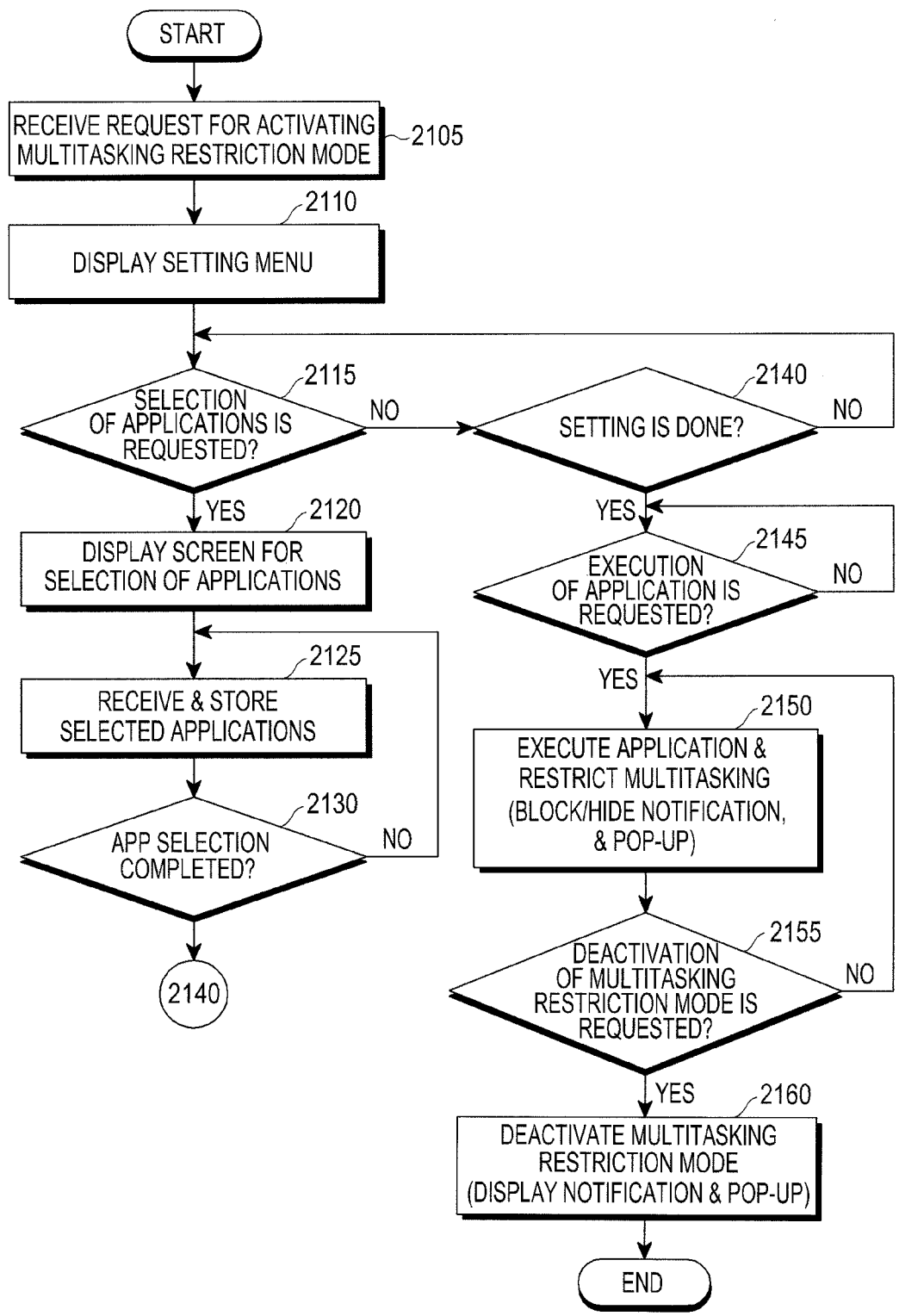
FIG. 21 is a flowchart illustrating a process for restricting multitasking of a smart phone according to an embodiment of the present disclosure.

FIG. 21 is a flowchart illustrating a process for restricting multitasking of a portable device according to an embodiment of the present disclosure.

Referring to FIG. 21, in operation 2105, the portable device receives the request for activation of the multitasking restriction mode. In an embodiment of the present disclosure, the portable device may receive the request for the multitasking restriction mode by means of the setting menu or the execution of the exclusive application for the multitasking restriction mode. In operation 2110, the portable device displays the setting menu 1600 for the multitasking restriction mode in response to the request on the screen thereof.

In operation 2115, the portable device determines whether the selection of applications to be applied with the multitasking restriction mode is requested in the setting menu. For example, when a touch on the "Selection of applications" item is detected, the portable device concludes that the selection of applications has been requested, to thereby proceed to operation 2120, and otherwise the portable device proceeds to operation 2140.

In operation 2120, the application list 1700 including icons of applications able to be applied with the multitasking restriction mode is displayed on the screen of the portable device. In operation 2125, the portable device receives the user input for selecting at least one application of the application list 1700, and stores the information of the selected application in response to the user input. In operation 2130, if the portable device receives the user input that the selection of application is completed, it proceeds to operation 2140, and otherwise the portable device returns to operation 2125 to continue to select the applications to be applied with the multitasking restriction mode. For example, the portable device presents the "Apply" button 1706 at the bottom of the application list 1700. If a touch on the "Apply" button 1706 is detected, the sequence returns to operation 2110.

In operation 2140, the portable device determines whether the setting of the multitasking restriction mode is completed or not. For example, the portable device displays the setting menu including a "Done" button at the bottom thereof, and concludes that the setting of the multitasking restriction mode has been completed upon the detection of a touch on the "Done" button. As another example, if the "Back" button is pressed in the presence of the setting menu on the screen, the portable device may conclude that the setting of the multitasking restriction mode is completed. If it is concluded that the setting of the multitasking restriction mode has not been completed, the portable device returns to operation

2115. Contrarily, when the setting of the multitasking restriction mode has been completed, the sequence proceeds to operation 2145.

In operation 2145, the portable device monitors whether the application to be applied with the multitasking restriction mode is requested for execution. The application may be requested for execution by the user through the home screen, the application menu, the launcher, the file explorer, and the like. If the application is requested for execution, in operation 2150, the portable device performs the application to thereby display the application contents on an execution screen area of the screen. At the same time, the portable device activates the multitasking restriction mode. Under the multitasking restriction mode, the portable device will ignore detection of a user's gesture on the area other than the execution screen area, and the user input by means of the home button and the back button. Although the push notification messages are received from the network or the pop-up messages are generated in the portable device, the portable device does not display the presence of the messages on the status bar and does not output the alert tone for the messages, but the push notification messages and the pop-up messages are stored in the portable device.

In operation 2155, the portable device determines whether the deactivation of the multitasking restriction mode is requested or not. For example, the portable device may conclude that the deactivation of the multitasking restriction mode has been requested at the time when the predefined time has expired since the execution of the multitasking restriction mode. In another embodiment of the present disclosure, if the portable device receives the user input for deactivation of the multitasking restriction mode under the multitasking restriction mode, it may be concluded that the deactivation of the multitasking restriction mode has been requested. The user input for deactivation of the multitasking restriction mode may be implemented by, for example, selecting a "Deactivation of use restriction" item of the menu button.

If the deactivation of the multitasking restriction mode is not requested, the portable device returns to operation 2150 to keep the application as executed under the multitasking restriction mode. Contrarily, if the deactivation of multitasking restriction mode has been requested, the portable device deactivates the multitasking restriction mode at operation 2160. Accordingly, now the portable device is able to respond to the user input on the screen area, e.g., the status bar, other than the execution screen area, and the user input by means of the home button and the back button.

At the time that the multitasking restriction mode is deactivated, the portable device checks whether the push notification messages have been received from the network or the pop-up messages have been generated in the portable device during the activation of the multitasking restriction mode. If there are any messages, the portable device may inform of the presence of the corresponding messages by means of the status bar or a pop-up message, and may output the alert tone for the messages at the time of deactivation of the multitasking restriction mode.

Although not shown in the drawings, in a case in which the termination of an application is requested by the user during the execution of the application, the portable device may terminate the corresponding application and deactivate the multitasking restriction mode as well.

Figure 22:
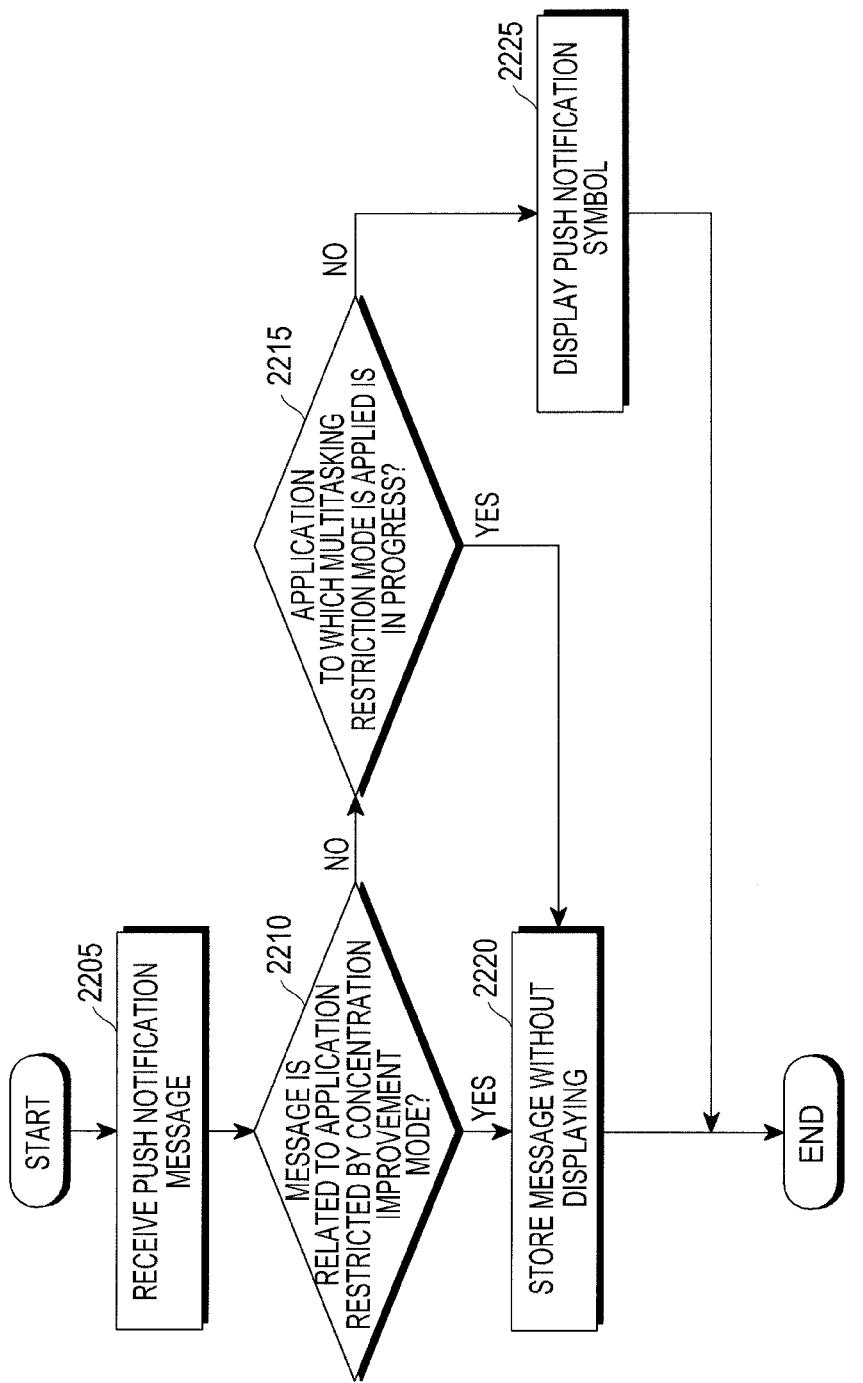
FIG. 22 is a flowchart illustrating a process of blocking notification of receipt of a push notification message according to an embodiment of the present disclosure.

FIG. 22 is a flowchart illustrating a process for blocking notification of the receipt of a push notification message according to an embodiment of the present disclosure.

Referring to FIG. 22, the figure illustrates a process for blocking the notification of the receipt of push notification messages according to the aforementioned concentration improvement mode and multitasking restriction mode, which will be described herein.

Referring to FIG. 22, in operation 2205, the portable device receives a push notification message associated with a certain application. Also, in operation 2210, the portable device determines whether the push notification message is related to the first application to be restricted by the concentration improvement mode, and also whether the concentration improvement mode is activated. More specifically, the portable device may store the applications, which are selected to be restricted under the concentration improvement mode by means of the "Selection of applications" item 506 and 1106 of the setting menu 500 and 1100 in FIG. 5 or FIG. 11, as the first applications. Then, the portable device may determine whether the push notification messages are related with the first applications based on the stored information at the time when the push notification messages are received or generated.

If the push notification messages are related with the first applications under the concentration improvement mode, the portable device proceeds to operation 2220, and otherwise the portable device proceeds to operation 2215.

At operation 2215, the portable device determines whether the second applications, which are to be applied with the multitasking restriction mode, are in progress at the time when the push notification messages are received. More specifically, the portable device may store the applications, which are selected to be applied with the multitasking restriction mode by means of the setting menu 1600 in FIG. 16, as the second applications. Then, the portable device may determine whether at least one of the second applications is in progress based on the stored information at the time when the push notification message is received. If the second application is in progress, the portable device proceeds to operation 2220, and otherwise the portable device proceeds to operation 2225.

In operation 2220, the portable device stores the push notification message, without displaying any information to inform of the receipt of push notification message. In more detail, the portable device does not display the notification symbol indicating that the push notification message has been received on the status bar, and does not output the alert tone or vibration as well. On the contrary, in operation 2225, the portable device displays the notification symbol indicating that the push notification message has been received on the status bar, and output the alert tone or vibration as well, to thereby allow the user to be informed of the presence of the push notification message.

When the pop-up message is generated in the portable device during the activation of the concentration improvement mode or the multitasking restriction mode, the portable device may ignore the pop-up message in a similar manner to that of FIG. 22.

Figure 23:
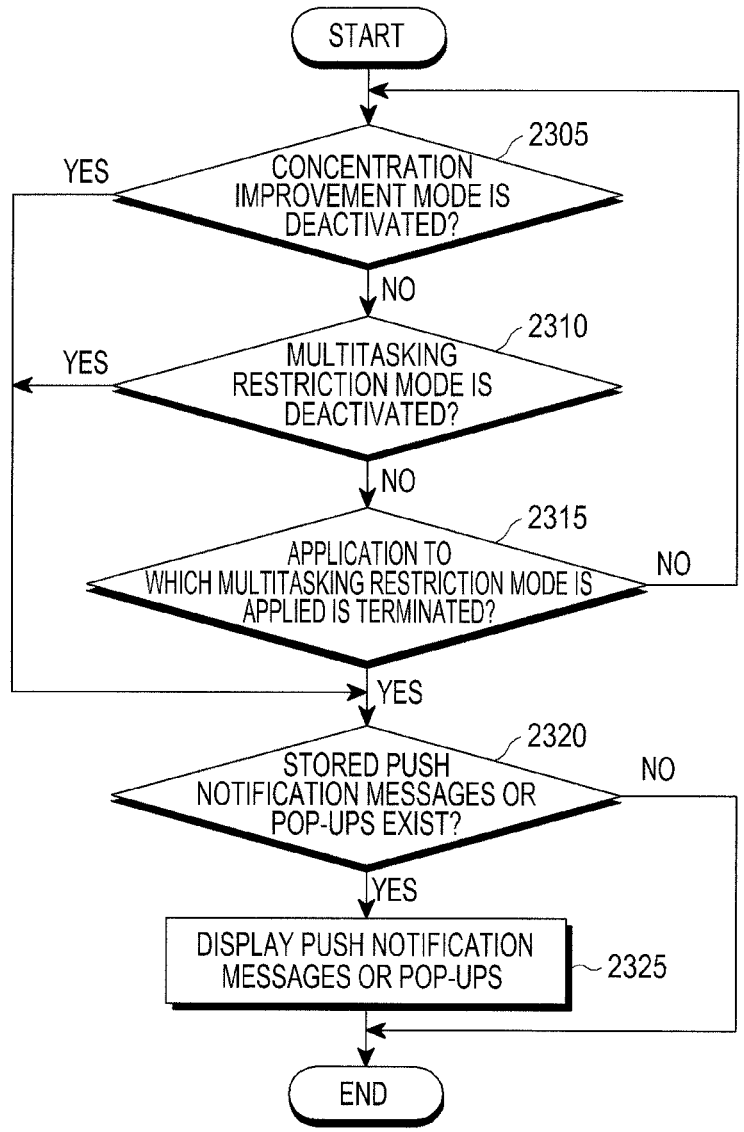
FIG. 23 is a flowchart illustrating a process of displaying a blocked push notification message according to an embodiment of the present disclosure.

FIG. 23 is a flowchart illustrating a process for displaying a blocked push notification message according to an embodiment of the present disclosure.

Referring to FIG. 23, the figure illustrates a process for informing of the receipt of push notification messages, which have been blocked according to the concentration improvement mode or the multitasking restriction mode, which will be described herein.

Referring to FIG. 23, in operation 2305, the portable device determines whether the concentration improvement mode has been deactivated. For example, the portable device may check whether the restriction time of the concentration improvement mode has expired, or whether the deactivation of concentration improvement mode has been requested by the user. If the concentration improvement mode has been deactivated, the portable device proceeds to operation 2320, and otherwise the portable device proceeds to operation 2310. In operation 2310, the portable device determines whether the multitasking restriction mode has been deactivated. For example, the portable device may check whether the preset time for the multitasking restriction mode has expired, or whether the deactivation of multitasking restriction mode has been requested by the user. If the multitasking restriction mode has been deactivated, the portable device proceeds to operation 2320, and otherwise the portable device proceeds to operation 2315.

In operation 2315, the portable device determines whether the application is terminated, wherein the application is being performed under the multitasking restriction mode. If the application is terminated, the portable device proceeds to operation 2320, and otherwise the portable device returns to operation 2305.

In operation 2320, the portable device determines whether the push notification messages exist, which are stored in the portable device without having been informed of the user. Specifically, the portable device determines whether the push notification messages or the pop-up messages exist, which have been blocked by the concentration improvement mode or the multitasking restriction mode. If there are the push notification messages or the pop-up messages, the portable device proceeds to operation 2325 to display the same, and/or to thereby present the notification symbol and/or the alert tone and vibration informing of the presence of the push notification messages or the pop-up messages. On the contrary, if there are no push notification messages or pop-up messages, the portable device terminates the process.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of restricting a use of a portable device, the method comprising:
    displaying an application list) of a setting menu for a first on a display screen of the portable device in response to a first user input for setting of the first mode in which execution of at least one application is restricted on the portable device before executing the at least one application, wherein the application list comprises a plurality of applications to which the first mode is applicable;
    receiving a second user input for at least one application for the first mode through the application list;
    receiving a third user input for setting a restriction time for the first mode;
    in response to a fourth user input for activation of the first mode, deactivating at least one icon corresponding to the at least one application on the display screen of the portable device, and blocking at least one notification message provided by the at least one application;
    when a fifth user input for deactivation of the first mode is received, determining whether a number of times that the first mode has been deactivated is more than a predetermined times;
    if the number of times that the first mode has been deactivated is more than the predetermined times, displaying a message that the deactivation of the first mode is not available on the display screen of the portable device, and
    if the number of times that the first mode has been deactivated is less than or equal to the predetermined times, deactivating the first mode.

2. The method of claim 1, further comprising:
    activating the at least one icon corresponding to the at least one application when the restriction time has expired.

3. The method of claim 1, further comprising;
    displaying at least one notification message when the restriction time has expired.

4. The method of claim 1,
    wherein the fifth user input for the deactivation comprises an entry of a personal identification number (PIN).

5. The method of claim 4, wherein the deactivating of the first mode further comprises:
    deactivating the first mode if the PIN corresponds to a PIN for deactivating the first mode; and
    updating the number of times that the first mode has been deactivated.

6. The method of claim 1, further comprising:
    displaying, during the restriction time, an indicator corresponding to activation of the first mode on the display screen.

7. The method of claim 1, wherein the deactivating of the at least one icon comprises hiding the at least one icon from at least one of a home screen, a menu, a file explorer, or a launcher on the display screen.

8. The method of claim 1, wherein the deactivating of the at least one icon, comprises ignoring a selection of the at least one icon on at least one of a home screen, a menu, a file explorer, and a launcher by not executing the at least one application.

9. The method of claim 1, wherein the at least one notification message comprises at least one of a message received from outside of the portable device and a message generated in the portable device.

10. The method of claim 1, wherein the blocking of the at least one notification message comprises:
- determining whether a received push notification message is related to the at least one application, and
- storing the received push notification message without displaying on the display screen if the received push notification message is related to the at least one application and the first mode has been activated.

11. The method of claim 5, further comprising:
- displaying a notification window in response to a user input that requests opening of the notification window on a status bar of the display screen during the first mode,
- wherein the notification window comprises a notification line informing that the first mode is being activated, and
- wherein the notification line comprises at least one of an amount of time remaining before the first mode is deactivated or the number of times that the first mode has been deactivated.

12. A portable device comprising:
- a display screen; and
- at least one processor configured to execute instructions to:
- control a first mode of the portable device, display an application list of a setting menu for a first mode on the display screen in response to a first user input for setting of the first mode in which execution of at least one application is restricted on the portable device before executing the at least one application, wherein the application list comprises a plurality of applications to which the first mode is applicable, receive a second user input for at least one application for through the application list, receive a third user input for setting a restriction time for the first mode;
- in response to a fourth user input for activation of the first mode, deactivate at least one icon corresponding to the at least one application on the display screen of the portable device, and block at least one notification message provided by the at least one application;
- when a fifth user input for deactivation of the first mode is received, determining whether a number of times that the first mode has been deactivated is more than a predetermined times;
- if the number of times that the first mode has been deactivated is more than the predetermined times, display a message that the deactivation of the first mode is not available on the display screen of the portable device, and
- if the number of times that the first mode has been deactivated is less than or equal to the predetermined times, deactivate the first mode.

13. The portable device of claim 12, wherein, when the restriction time has expired, the at least one processor is further configured to activate the at least one icon corresponding to the at least one application.

14. The portable device of claim 12, wherein, when the restriction time has expired, the at least one processor is further configured to display at least one notification message.

15. The portable device of claim 12, wherein the at least one notification message comprises at least one of a message received from outside of the portable device or a message generated in the portable device.

16. The portable device of claim 12,
wherein the fifth user input for the deactivation comprises an entry of a personal identification number (PIN).

17. The portable device of claim 16, wherein the at least one processor is further configured to:
- deactivate the first mode if the PIN corresponds to a PIN for deactivating the first mode, and
- update the number of times that the first mode has been deactivated.

18. The portable device of claim 12, wherein the at least one processor is further configured to display, during the restriction time, an indicator corresponding to activation of the first mode on the display screen.

19. The portable device of claim 12, wherein the at least one processor is further configured to, when deactivating of the at least one icon, hide the at least one icon from at least one of a home screen, a menu, a file explorer, or a launcher on the display screen.

20. The portable device of claim 12, wherein the at least one processor is further configured to, when deactivating the at least one icon, ignore a selection of the at least one icon on at least one of a home screen, a menu, a file explorer, or a launcher by not executing the at least one application.

21. The portable device of claim 12, wherein the at least one processor is further configured to:
- determine whether a received push notification message is related to the at least one application, and
- store the received push notification message without displaying on the display screen if the received push notification message is related to the at least one application and the first mode has been activated.

22. The portable device of claim 17,
wherein the at least one processor is further configured to display a notification window in response to a user input that requests opening of the notification window on a status bar of the display screen during the first mode,
wherein the notification window comprises a notification line informing that the first mode is being activated, and
wherein the notification line comprises at least one of an amount of time remaining before the first mode is deactivated or the number of times that the first mode has been deactivated.

* * * * *